US009506535B2

(12) United States Patent
Hashimoto et al.

(10) Patent No.: US 9,506,535 B2
(45) Date of Patent: Nov. 29, 2016

(54) IMAGE-FORMING APPARATUS PROVIDED WITH INTERLOCKING MECHANISM FOR INPUTTING DRIVE FORCE TO DRIVE ROLLER OF BELT UNIT

(71) Applicant: Brother Kogyo Kabushiki Kaisha, Nagoya-shi, Aichi-ken (JP)

(72) Inventors: Yohei Hashimoto, Nagakute (JP); Wen Chen, Nagoya (JP); Wataru Yamaguchi, Nisshin (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 0 days.

(21) Appl. No.: 14/868,932

(22) Filed: Sep. 29, 2015

(65) Prior Publication Data

US 2016/0091857 A1 Mar. 31, 2016

(30) Foreign Application Priority Data

Sep. 30, 2014 (JP) .................. 2014-199760
Sep. 30, 2014 (JP) .................. 2014-199772

(51) Int. Cl.
*G03G 15/00* (2006.01)
*F16H 7/08* (2006.01)
*G03G 21/16* (2006.01)

(52) U.S. Cl.
CPC .......... *F16H 7/0827* (2013.01); *G03G 21/168* (2013.01); *G03G 21/1633* (2013.01); *G03G 2215/0141* (2013.01); *G03G 2215/1623* (2013.01); *G03G 2221/1684* (2013.01)

(58) Field of Classification Search
CPC ............. G03G 15/757; G03G 15/751; G03G 2221/1684; G03G 21/1671; G03G 21/1647
USPC ...................................................... 399/117
See application file for complete search history.

(56) References Cited

U.S. PATENT DOCUMENTS 7,903,997 B2   3/2011  Jung et al.
8,401,429 B2   3/2013  Murayama
(Continued)

FOREIGN PATENT DOCUMENTS

JP       H10-91053 A       4/1998
JP       2001-305882 A     11/2001
(Continued)

OTHER PUBLICATIONS

Jun. 25, 2015—(US) Co-pending U.S. Appl. No. 14/750,255.
(Continued)

*Primary Examiner* — Walter L Lindsay, Jr.
*Assistant Examiner* — Frederick Wenderoth
(74) *Attorney, Agent, or Firm* — Banner & Witcoff, Ltd.

(57) ABSTRACT

An image-forming apparatus includes a main body, a drive source, an image forming section, a coupling and an interlocking mechanism. The image forming section includes a trigger part and a belt unit including: a belt; and a drive roller and a follow roller opposing each other in a first direction perpendicular to an axial direction of the drive roller. The belt is stretched over the drive roller and the follow roller to extend in the first direction. The coupling includes a movable part movable between a transmitting position transmitting a drive force from the drive source to the drive roller and an interrupting position interrupting transmission of the drive force from the drive source to the drive roller. The interlocking mechanism is configured to interlock movement of the movable part between the transmitting position and the interrupting position with movement of the trigger part.

23 Claims, 16 Drawing Sheets

(56) References Cited

U.S. PATENT DOCUMENTS

| | | |
|---|---|---|
| 8,532,528 B2 | 9/2013 | Kawashima et al. |
| 9,042,780 B2 | 5/2015 | Ando et al. |
| 2007/0048005 A1* | 3/2007 | Nakano .............. G03G 21/1647 399/110 |
| 2008/0134824 A1* | 6/2008 | Jung .................. G03G 21/1647 74/473.1 |
| 2008/0138112 A1 | 6/2008 | Nakashima |
| 2009/0129814 A1 | 5/2009 | Okaji |
| 2010/0189462 A1 | 7/2010 | Kawashima et al. |
| 2011/0076051 A1 | 3/2011 | Murayama |
| 2011/0200355 A1 | 8/2011 | Mori et al. |
| 2012/0213548 A1 | 8/2012 | Kawashima et al. |
| 2013/0084099 A1 | 4/2013 | Hashimoto et al. |
| 2014/0023394 A1 | 1/2014 | Kawashima et al. |
| 2014/0093279 A1* | 4/2014 | Hayakawa ......... G03G 21/1821 399/117 |
| 2014/0099142 A1 | 4/2014 | Ando et al. |
| 2014/0186073 A1 | 7/2014 | Ju et al. |
| 2015/0160602 A1 | 6/2015 | Kawashima et al. |
| 2015/0274457 A1 | 10/2015 | Yamaguchi |

FOREIGN PATENT DOCUMENTS

| | | |
|---|---|---|
| JP | 2002-182537 A | 6/2002 |
| JP | 2005-043387 A | 2/2005 |
| JP | 2007-057952 A | 3/2007 |
| JP | 2011-075618 A | 4/2011 |
| JP | 2012-068684 A | 4/2012 |
| JP | 2013-076860 A | 4/2013 |
| JP | 2014-077866 A | 5/2014 |

OTHER PUBLICATIONS

Dec. 2, 2015—(US)—Non-Final Office Action—U.S. Appl. No. 14/750,255.

May 25, 2016—(US) Notice of Allowance—U.S. Appl. No. 14/750,255.

* cited by examiner

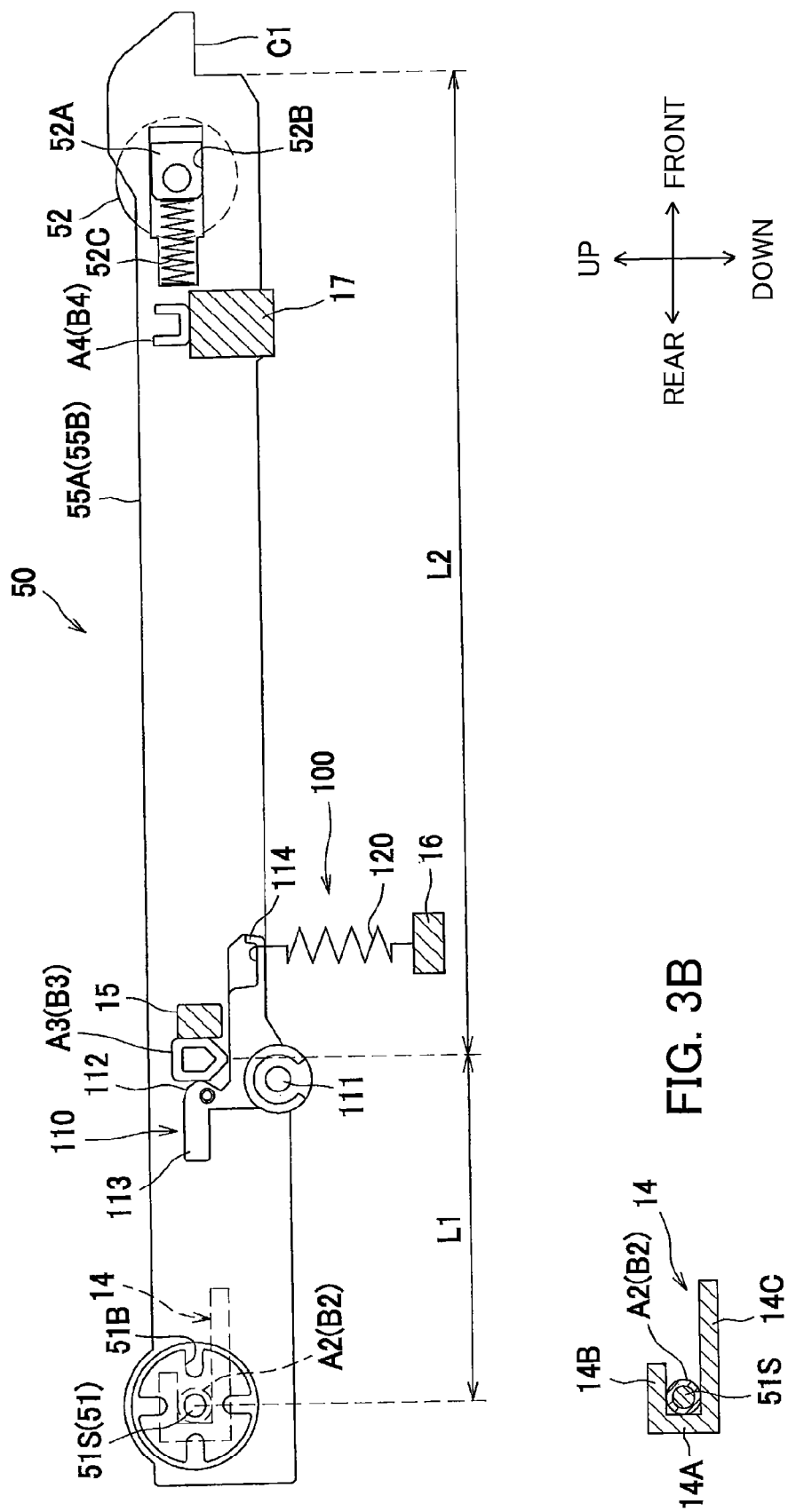
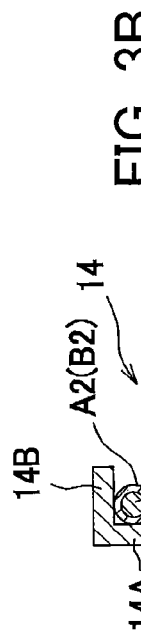
FIG. 3A
FIG. 3B

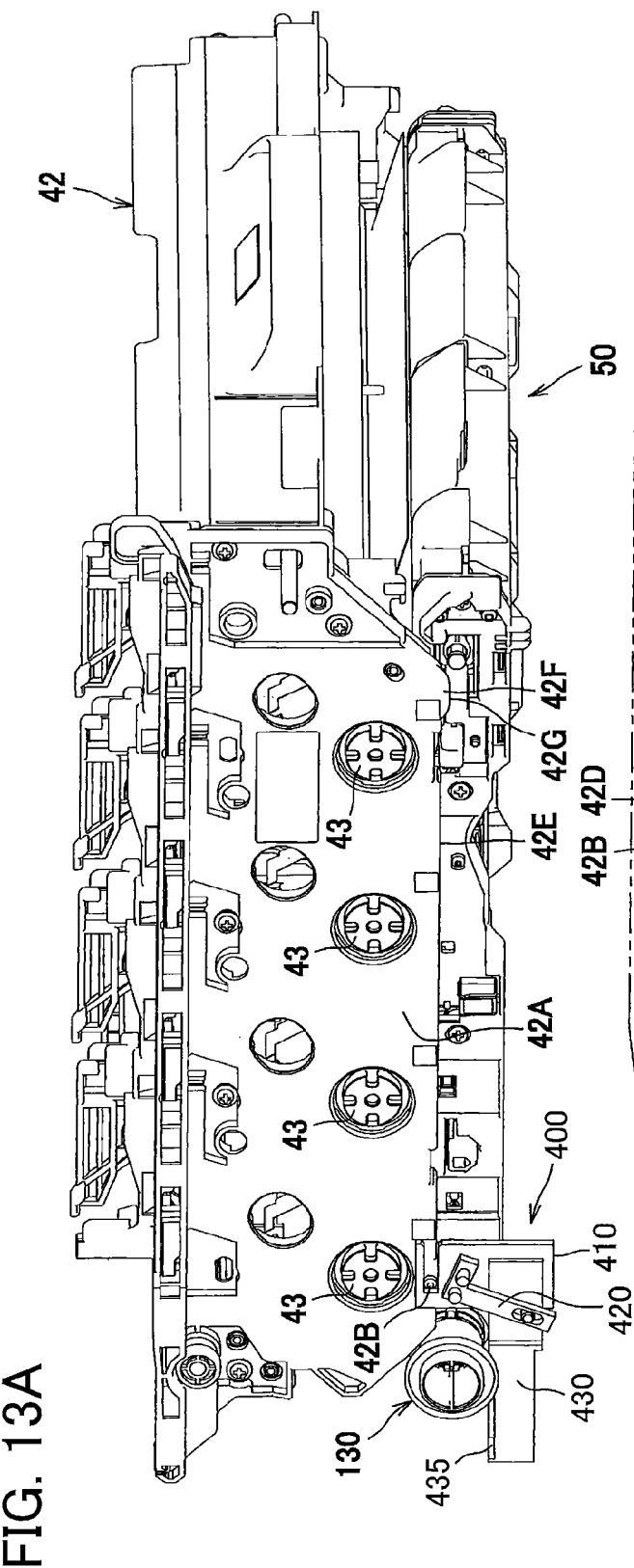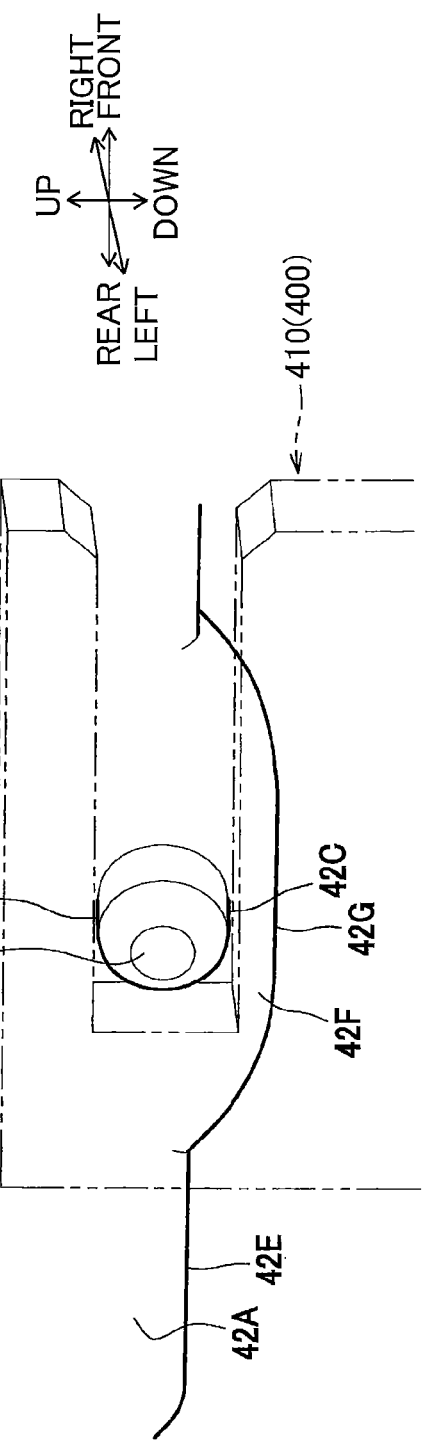

IMAGE-FORMING APPARATUS PROVIDED WITH INTERLOCKING MECHANISM FOR INPUTTING DRIVE FORCE TO DRIVE ROLLER OF BELT UNIT

CROSS REFERENCE TO RELATED APPLICATION

This application claims priorities from Japanese Patent Application Nos. 2014-199760 filed Sep. 30, 2014 and 2014-199772 filed Sep. 30, 2014. The entire contents of these priority applications are incorporated herein by reference.

TECHNICAL FIELD

The present disclosure relates to an image forming apparatus provided with a belt stretched over a drive roller and a follow roller.

BACKGROUND

One image-forming apparatus known in the art includes a belt unit having a belt, and a drive roller that drives the belt; a coupling having a movable part configured to advance toward and couple with the drive roller and to uncouple and retract from the drive roller; a cover configured to open and close an opening formed in a main body; and an interlocking mechanism configured to advance and retract the movable part of the coupling in association with the opening and closing of the cover. In this image-forming apparatus, the movable part is configured to be retracted from the drive roller when the cover is opened and to be coupled with the drive roller when the cover is closed.

However, in this conventional mechanism, the movable part of the coupling is configured to move in association with the opening and closing of the cover. Since the cover is frequently opened and closed when resolving paper jams, replacing toner cartridges, and the like, the movable part is frequently uncoupled from and coupled to the drive roller, even in cases when the belt unit is not being removed or mounted. Consequently, coupling portions of the movable part and the drive roller may become worn.

Further, since the movable part of the coupling is configured to move in association with the movement of the cover, the connection provided by the coupling may become unstable when the cover is not completely closed.

SUMMARY

In view of the foregoing, it is an object of the present disclosure to provide an image-forming apparatus having a configuration that does not require a movable part to uncouple from or couple with another member, such as a drive roller, except when a belt unit is being mounted or removed.

It is another object of the present disclosure to provide an image-forming apparatus that is capable of maintaining proper operations of a belt unit by ensuring that a movable part of a coupling, which functions to transmit a drive force to a drive roller of the belt unit, advances and retracts properly relative to the drive roller.

In order to attain the above and other objects, the disclosure provides an image-forming apparatus that may include: a main body; a drive source provided in the main body and configured to generate a drive force; an image forming section configured to form an image; a coupling; and an interlocking mechanism. The image forming section includes a trigger part and a belt unit. The belt unit includes a belt, a drive roller and a follow roller. The drive roller defines an axis extending in an axial direction and is configured to rotate about the axis. The follow roller opposes the drive roller in a first direction perpendicular to the axial direction, the belt being stretched over the drive roller and the follow roller and extending in the first direction. The coupling includes a movable part configured to move between a transmitting position transmitting the drive force from the drive source to the drive roller and an interrupting position interrupting transmission of the drive force from the drive source to the drive roller. The interlocking mechanism is provided in the main body and is configured to interlock movement of the movable part between the transmitting position and the interrupting position with movement of the trigger part of the image forming section.

According to another aspect, the disclosure provides an image-forming apparatus that may include: a main body; a drive source configured to generate a drive force; a belt unit attachable to and detachable from the main body; a coupling; a moving member; and an interlocking mechanism. The belt unit includes: a belt; a drive roller defining an axis extending in an axial direction and configured to rotate about the axis; and a follow roller, opposing the drive roller in a first direction perpendicular to the axial direction, the belt being stretched over the drive roller and the follow roller and extending in the first direction. The coupling includes a movable part configured to move between a transmitting position transmitting the drive force from the drive source to the drive roller and an interrupting position interrupting transmission of the drive force from the drive source to the drive roller. The moving member is configured to move between a first position and a second position in accordance with attachment and detachment of the belt unit relative to the main body, the moving member moving from the first position to the second position upon attachment of the belt unit to the main body, the moving member moving from the second position to the first position upon detachment of the belt unit from the main body. The interlocking mechanism is configured to interlock the movement of the movable part with the movement of the moving member, the interlocking mechanism being configured to move the movable part to the transmitting position in conjunction with movement of the moving member from the first position to the second position, the interlocking mechanism being configured to move the movable part to the interrupting position in conjunction with movement of the moving member from the second position to the first position.

According to still another aspect, the disclosure provides an image-forming apparatus that may include: a main body; a drive source configured to generate a drive force; a belt unit; a coupling; a plurality of photosensitive drums; a moving member; and an interlocking mechanism. The belt unit includes: a belt; a drive roller defining an axis extending in an axial direction and configured to rotate about the axis; and a follow roller opposing the drive roller in a first direction perpendicular to the axial direction, the belt being stretched over the drive roller and the follow roller and extending in the first direction. The coupling includes a movable part configured to move between a transmitting position transmitting the drive force from the drive source to the drive roller and an interrupting position interrupting transmission of the drive force from the drive source to the drive roller. The plurality of photosensitive drums is juxtaposed in the first direction. The moving member is configured to support the plurality of photosensitive drums and is configured to move between a first position and a second position relative to the main body in a second direction crossing the first direction but different from the axial direction, the moving member at the first position allowing the photosensitive drums supported by the moving member to be in contact with the belt of the belt unit, the moving member at the second position allowing the photosensitive drums supported by the moving member to be separated from the belt of the belt unit. The interlocking mechanism is configured to interlock the movement of the movable part with the movement of the moving member, the interlocking mechanism being configured to move the movable part to the transmitting position in conjunction with movement of the moving member from the first position to the second position, the interlocking mechanism being configured to move the movable part to the interrupting position in conjunction with movement of the moving member from the second position to the first position.

BRIEF DESCRIPTION OF THE DRAWINGS

The particular features and advantages of the disclosure as well as other objects will become apparent from the following description taken in connection with the accompanying drawings, in which:

FIG. 3A is a simplified left side view illustrating a relationship among the belt unit, pressing mechanisms and restricting parts provided on a main body of the color printer according to the first embodiment;

FIG. 3B is a cross-sectional view illustrating how bearing parts of the belt unit are received by the restricting parts according to the first embodiment;

FIG. 13A is a perspective view showing the holder and the belt unit according to the second embodiment as viewed from the left side thereof;

FIG. 13B is a partially enlarged view illustrating a structure near an engaging protrusion provided on the holder according to the second embodiment;

DETAILED DESCRIPTION

1. First Embodiment

A color printer 1 according to a first embodiment will be described while referring to FIGS. 1 through 8.

Directions in the following description will be based on a perspective of a user using the color printer 1. Specifically, the right side of FIG. 1 will be called the "front," the left side will be called the "rear," the near side will be called the "left," and the far side will be called the "right." Further, the "top" and "bottom" of FIG. 1 will be the vertical direction of the color printer 1.

Figure 1:
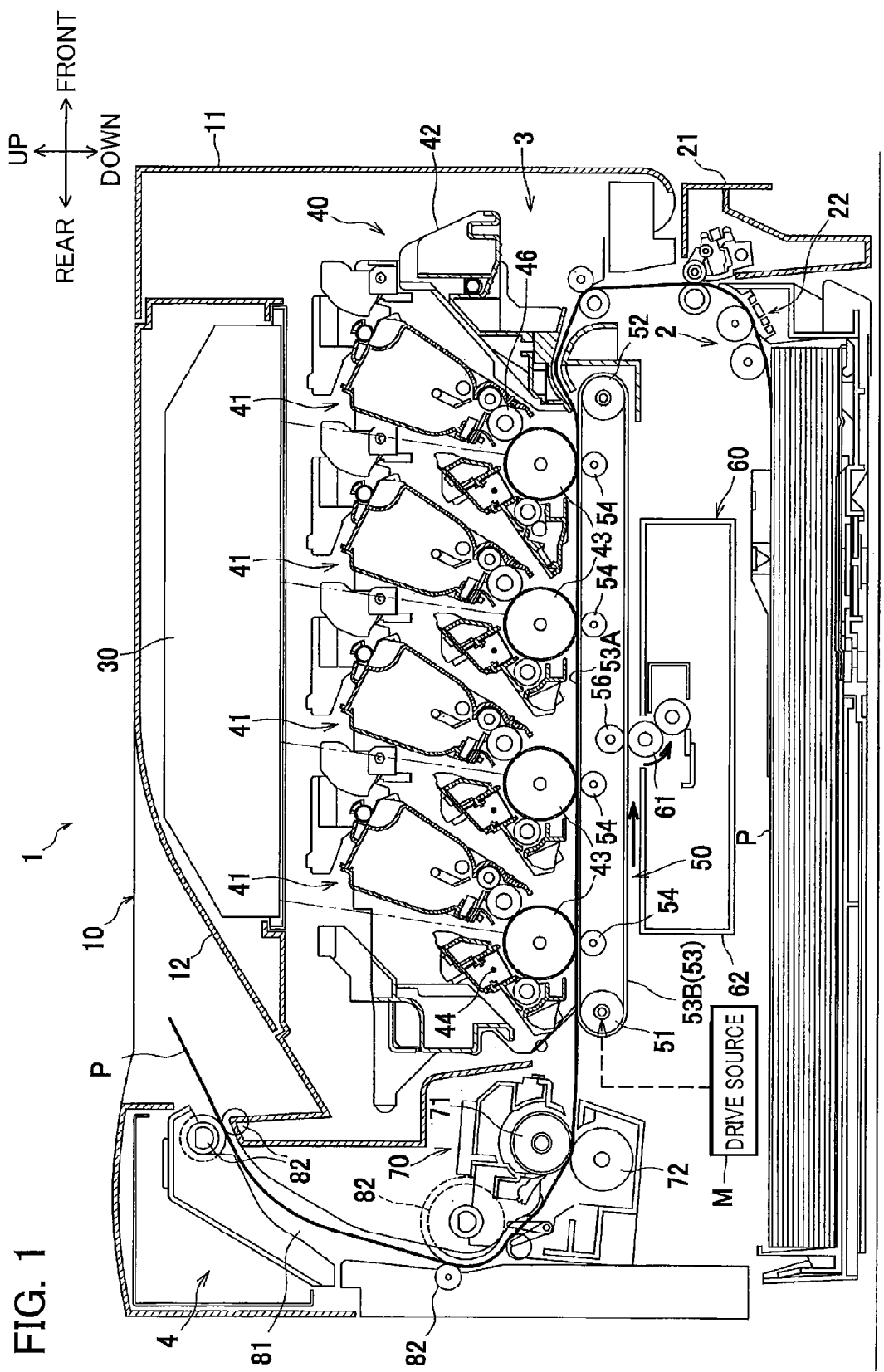
FIG. 1 is a cross-sectional view showing a general construction of a color printer according to a first embodiment.

As shown in FIG. 1, the color printer 1 as an example of an image-forming apparatus includes a main body 10. Within the main body 10, primarily provided are a sheet-feeding section 2 for supplying sheets P of paper to be printed, an image-forming section 3 for forming images on the sheets P supplied by the sheet-feeding section 2, and a sheet-discharging section 4 for discharging sheets P from the main body 10 after the image-forming section 3 has formed images thereon.

The sheet-feeding section 2 is provided in a bottom portion of the main body 10. The sheet-feeding section 2 primarily includes a sheet tray 21 configured to accommodate the sheets P of paper, and a sheet-feeding mechanism 22 for supplying the sheets P from the sheet tray 21 to the image-forming section 3. The sheet-feeding mechanism 22 is configured to separate the sheets P in the sheet tray 21 and supply the sheets P one at a time to the image-forming section 3.

The image-forming section 3 primarily includes an exposure unit 30, an image-forming unit 40, a belt unit 50, a belt cleaner 60, and a fixing unit 70.

The exposure unit 30 is provided in an upper portion of the main body 10. Although not shown in the drawings, the exposure unit 30 includes a laser light-emitting unit, a polygon mirror, lenses, reflecting mirrors, and the like.

The image-forming unit 40 is arranged between the sheet-feeding section 2 and the exposure unit 30. The image-forming unit 40 primarily includes four process units 4, and a holder 42 for retaining the four process units 41 that are juxtaposed in a front-rear direction. The holder 42 can be moved between a mounted position inside the main body 10 (shown in FIG. 1) and a removed position withdrawn from the main body 10.

The process units 41 are attachable to and detachable from the holder 42. Each process unit 41 includes a photosensitive drum 43 (as an example of a photosensitive member), a charger 44, and a developing roller 46, as well as a supply roller, a thickness-regulating blade, and a toner-accommodating portion for which reference numerals have been omitted.

The belt unit 50 is provided between the sheet-feeding section 2 and the image-forming unit 40. The belt unit 50 can be mounted in and removed from the main body 10. The belt unit 50 primarily includes a drive roller 51, a follow roller 52, an endless conveying belt 53 (as an example of a belt) stretched over the drive roller 51 and follow roller 52, and four transfer rollers 54.

The direction in which the conveying belt 53 is stretched taut by the drive roller 51 and follow roller 52 is the front-rear direction and is an example of a first direction. However, the first direction may be specified through a different expression. For example, the first direction may be specified as a direction in which the photosensitive drums 43 that contact the conveying belt 53 are juxtaposed.

The conveying belt 53 has a top surface 53A, and a bottom surface 53B. The top surface 53A extends in the front-rear direction and contacts each of the photosensitive drums 43. The bottom surface 53B also extends in the front-rear direction and contacts a cleaning roller 61 of the belt cleaner 60 described next. Further, a drive force generated by a drive source M, such as a motor, is configured to be transmitted to the drive roller 51. When the drive roller 51 is driven to rotate by this drive force, the conveying belt 53 circulates counterclockwise in FIG. 1.

The belt cleaner 60 is disposed below the belt unit 50. The belt cleaner 60 includes the cleaning roller 61, and a collection box 62. The cleaning roller 61 contacts the bottom surface 53B of the conveying belt 53. Toner collected from the conveying belt 53 is configured to be collected in the collection box 62. A backup roller 56 is disposed inside the loop formed by the conveying belt 53 such that the conveying belt 53 (bottom surface 53B) is nipped between the backup roller 56 and the cleaning roller 61.

The fixing unit 70 is disposed rearward of the image-forming unit 40 and the belt unit 50. The fixing unit 70 includes a heating roller 71, and a pressure roller 72 disposed to oppose the heating roller 71 and in pressure contact with the heating roller 71.

In an image-forming operation of the image-forming section 3, the charger 44 applies a uniform charge to a surface of the corresponding photosensitive drum 43, after which the exposure unit 30 irradiates laser beams (indicated by chain lines in FIG. 1) in a high-speed scan to expose the surfaces of the respective photosensitive drums 43 and form electrostatic latent images thereon. The supply rollers of the process units 41 supply toner from the corresponding toner-accommodating portions to the corresponding developing rollers 46, and the toner on the surfaces of the developing rollers 46 is maintained at a uniform thickness by the corresponding thickness-regulating blades.

The toner carried on the surfaces of the developing rollers 46 is then supplied to the electrostatic latent images formed on the corresponding photosensitive drums 43 to produce toner images on the photosensitive drums 43. Thereafter, a sheet P supplied onto the conveying belt 53 is conveyed between the photosensitive drums 43 and conveying belt 53 (transfer rollers 54), whereby the toner images formed on the respective photosensitive drums 43 are sequentially transferred to and superposed on the sheet P. After the toner images have been transferred onto the sheet P, the sheet P is conveyed between the heating roller 71 and pressure roller 72 of the fixing unit 70 to thermally fix the transferred toner image to the sheet P.

The sheet-discharging section 4 includes a curved discharge path 81 and a plurality of conveying rollers 82 for conveying the sheets P. The discharge path 81 extends upward from the exit point of the fixing unit 70 and subsequently curves frontward. After the toner image is thermally fixed to the sheet P in the fixing unit 70, the conveying rollers 82 convey the sheet P along the discharge path 81 and discharge the sheet P onto a discharge tray 12 provided on a top surface of the main body 10.

A front cover 11 is provided on a front end portion of the main body 10 and serves as a front wall that can be opened and closed. When the front cover 11 is opened, a user can pull the holder 42 out from the main body 10 to the removed position in order to remove the process units 41 from the holder 42. By removing the holder 42 at the removed position from the main body 10, the user can remove the belt unit 50 from the main body 10.

Next, a detailed structure near the belt unit 50 will be described.

Figure 2:
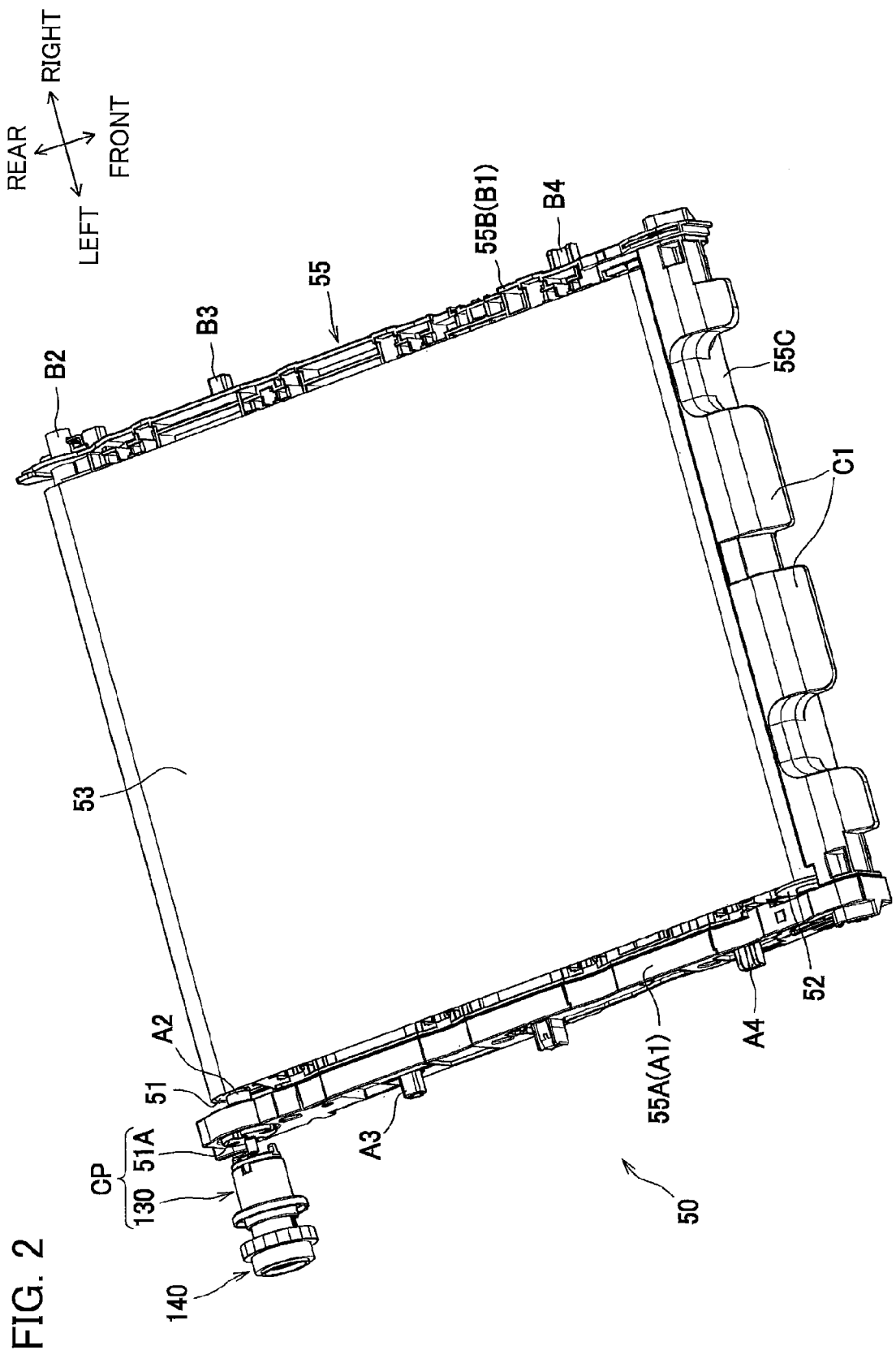
FIG. 2 is a perspective view showing a belt unit and a coupling according to the first embodiment.

As shown in FIG. 2, the belt unit 50 includes a frame 55 that rotatably supports the drive roller 51 and the follow roller 52.

Figure 4:
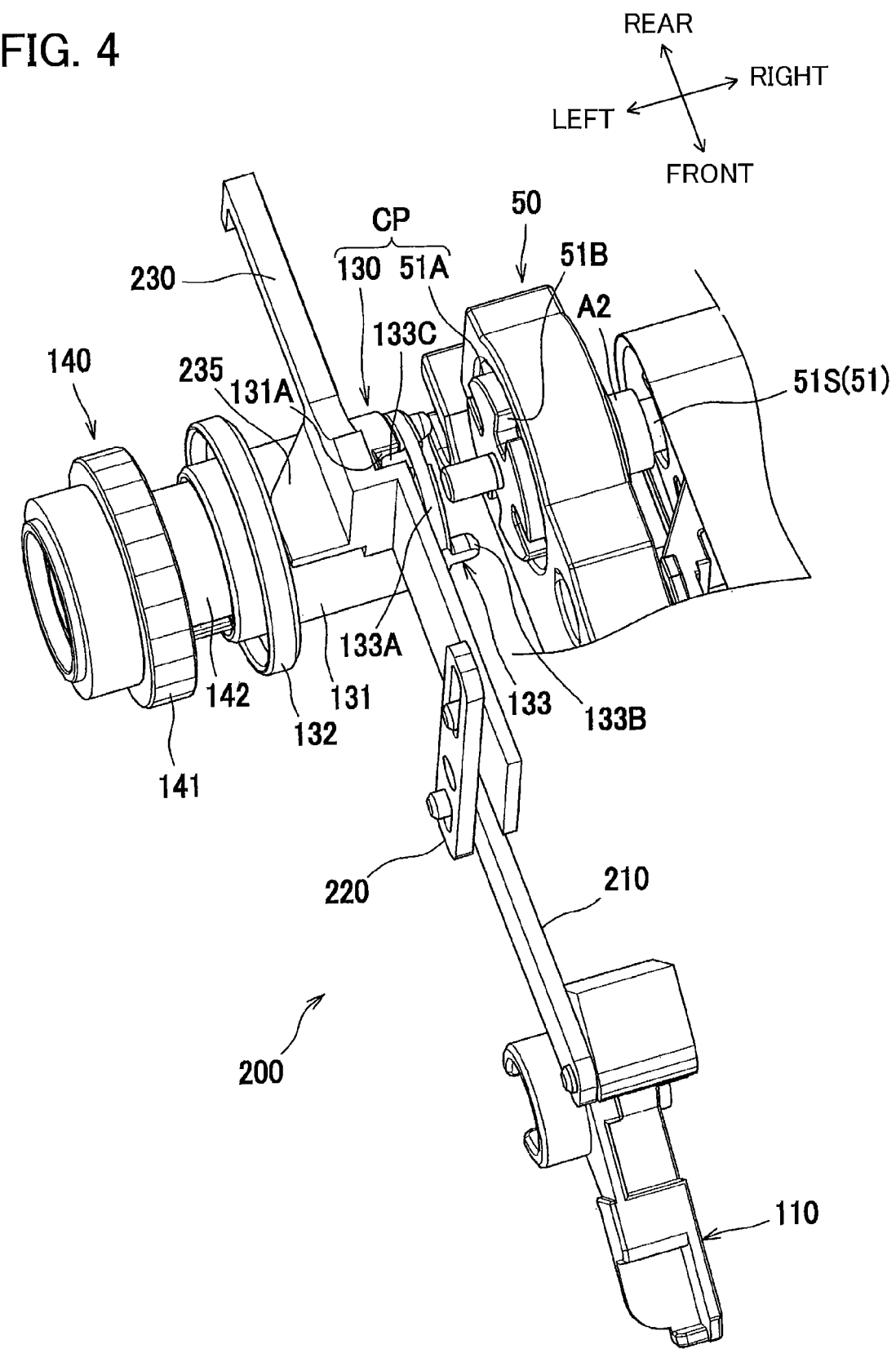
FIG. 4 is a partially enlarged perspective view illustrating an interlocking mechanism according to the first embodiment, wherein a pressing member of the pressing mechanism is in an initial position.

The drive roller 51 includes a shaft 51S extending in the left-right direction (see FIGS. 3A and 4). The shaft 51S defines an axis extending in an axial direction parallel to the left-right direction. The drive roller 51 can rotate about this axis extending in the axial direction upon receipt of the drive force from the drive source M.

The frame 55 has a left wall part 55A, a right wall part 55B and a front wall part 55C. The left wall part 55A and right wall part 55B are respectively disposed outward (on the left and right sides) of both rollers 51 and 52 in a left-right direction. The front wall part 55C bridges front ends of the both side wall parts 55A and 55B. Grip parts C1 are provided on an upper portion of the front wall part 55C and protrude forward therefrom. The user can grip the grip parts C1 when mounting and removing the belt unit 50 relative to the main body 10.

The right wall part 55B includes: a body part B1 that is elongated in the front-rear direction; and a bearing part B2, an engaging part B3, and a supported part B4 that protrude rightward from a right surface of the body part B1. Similarly, the left wall part 55A includes: a body part A1 that is elongated in the front-rear direction; a bearing part A2 that protrudes rightward from a right surface of the body part A1; and an engaging part A3 and a supported part A4 that protrude leftward from a left surface of the body part A1.

The bearing parts A2 and B2 are cylindrical-shaped portions provided on rear ends of the respective side wall parts 55A and 55B. The bearing parts A2 and B2 rotatably support respective end portions of the shaft 51S of the drive roller 51 (see FIG. 4). The shaft 51S of the drive roller 51 has a left end on which a belt-side coupling 51A is provided. A body-side coupling 130 is provided on the main body 10 as an example of a movable part. The body-side coupling 130 can couple to and uncouple from the belt-side coupling 51A. Together, the body-side coupling 130 and the belt-side coupling 51A constitute a coupling CP that functions as a switch for transmitting and interrupting the drive force from the drive source M to the drive roller 51. Four recessed parts 51B are formed in the belt-side coupling 51A at regular intervals in a circumferential direction thereof for receiving a pair of protruding parts 133B described later (see FIGS. 3A and 4).

The body-side coupling 130 is configured to advance toward and retract from the belt-side coupling 51A in the left-right direction, i.e., the axial direction of the drive roller 51. The body-side coupling 130 can move between an interrupting position (shown in FIGS. 2 and 4) for interrupting the transmission of the drive force from the drive source M to the drive roller 51, and a transmitting position (shown in FIG. 5) for transmitting the drive force from the drive source M to the drive roller 51. In other words, in the interrupting position, the body-side coupling 130 is uncoupled from the belt-side coupling 51A and retracted leftward in the axial direction of the drive roller 51. In the transmitting position, the body-side coupling 130 is coupled with the belt-side coupling 51A.

Figure 5:
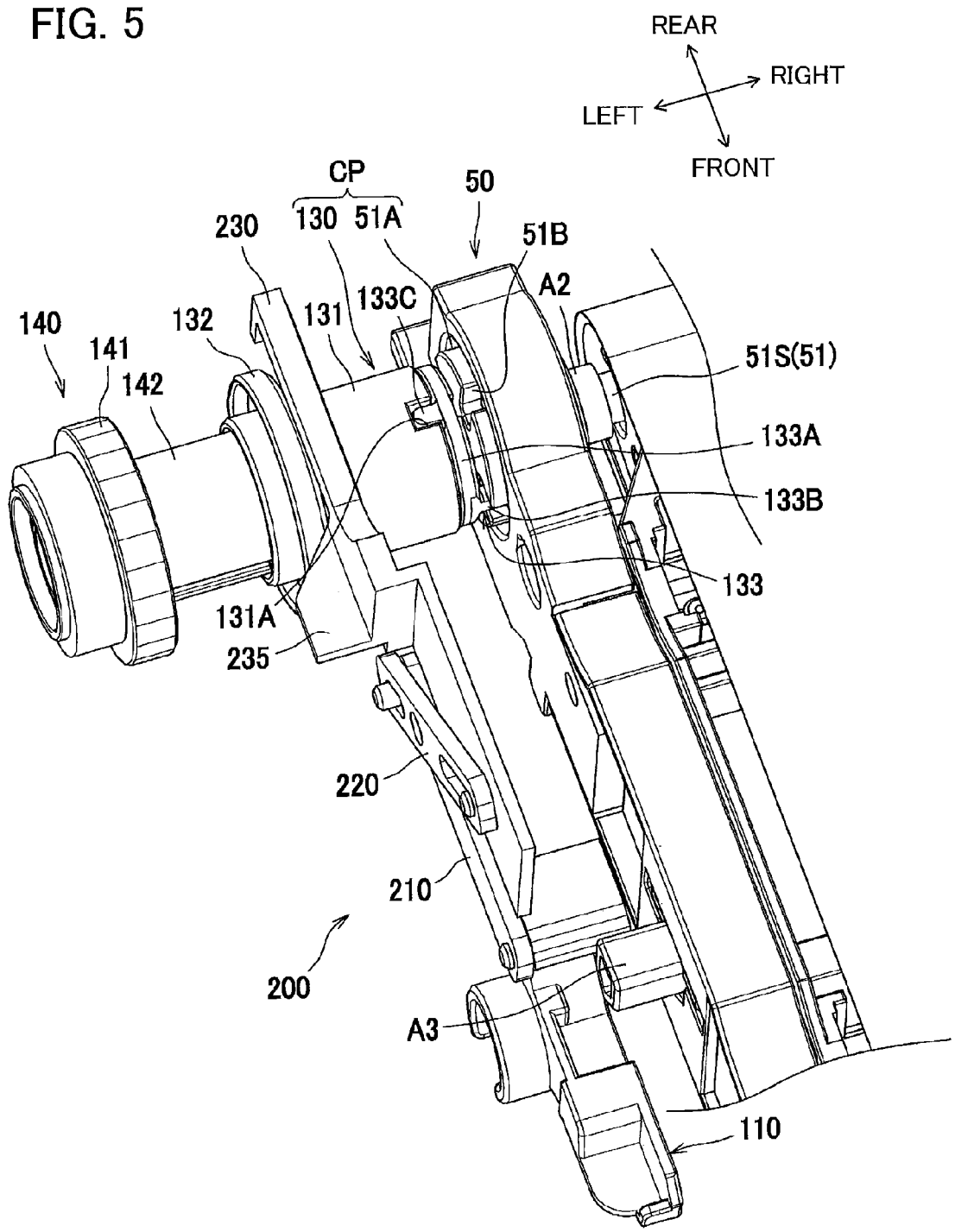
FIG. 5 is a partially enlarged perspective view illustrating the interlocking mechanism according to the first embodiment, wherein the pressing member of the pressing mechanism is in a pressing position.

As shown in FIGS. 4 and 5, a body-side drive gear 140 is rotatably provided on the main body 10. The body-side drive gear 140 supports the body-side coupling 130 so that the body-side coupling 130 can move in the axial direction of the drive roller 51. The body-side drive gear 140 includes a gear part 141 for receiving the drive force from the drive source M, and a protruding part 142 that protrudes from a center portion of the gear part 141 toward the body-side coupling 130.

The body-side coupling 130 includes a cylindrical part 131, a flange 132, and a joint 133 provided on a right end of the cylindrical part 131. The cylindrical part 131 receives the protruding part 142 of the body-side drive gear 140 inserted therein so that the cylindrical part 131 can move relative to the protruding part 142 in the axial direction but can engage the protruding part 142 in a rotating direction of the cylindrical part 131. On the right end of the cylindrical part 131, a groove 131A is formed to be recessed leftward. The groove 131A extends in a radial direction of the cylindrical part 131.

Figure 6A:
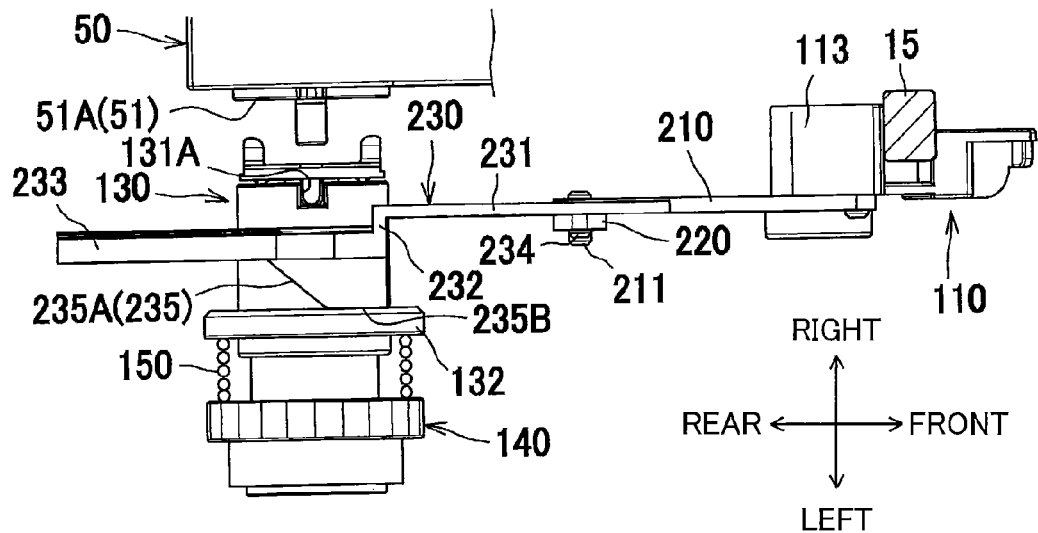
FIG. 6A is a top view of the interlocking mechanism according to the first embodiment, wherein the pressing member of the pressing mechanism is in the initial position.

The flange 132 protrudes radially outward from an outer peripheral surface of the cylindrical part 131 and has an annular shape. As shown in FIG. 6A, a compression coil spring 150 is disposed between the flange 132 and the body-side drive gear 140. The compression coil spring 150 is an example of a biasing member and functions to apply a biasing force to the body-side coupling 130 toward the belt-side coupling 51A.

The joint 133 functions to transmit the drive force from the body-side drive gear 140 to the drive roller 51 via the body-side coupling 130, even when the axis of the cylindrical part 131 constituting the body-side coupling 130 is offset from the axis of the drive roller 51. The joint 133 includes a disc-shaped base part 133A, the pair of protruding parts 133B that protrudes rightward from the base part 133A, and an engaging part 133C that engages in the groove 131A formed in the right end of the cylindrical part 131. The engaging part 133C engaging in the groove 131A can move in a first radial direction (specifically, in a radial direction of the cylindrical part 131).

The protruding parts 133B are disposed on a right surface of the base part 133A to be spaced apart from each other in a second radial direction orthogonal to the first radial direction. When inserted into two of the four recessed parts 51B formed in the belt-side coupling 51A that are arranged in a radial direction of the belt-side coupling 51A, the protruding parts 133B are capable of moving in the second radial direction while engaging with the recessed parts 51B in the rotating direction. With this arrangement, the joint 133 can transmit the drive force from the body-side drive gear 140 to the belt-side coupling 51A while the belt-side coupling 51A and cylindrical part 131 are engaged with each other in the rotating direction, even when the axis of the belt-side coupling 51A is radially offset from the axis of the body-side drive gear 140. Specifically, the cylindrical part 131 and joint 133 move relative to each other in the first radial direction, and the recessed parts 51B and joint 133 move relative to each other in the second radial direction, enabling the drive force to be transmitted even when the axes of the body-side drive gear 140 and belt-side coupling 51A are radially offset from each other.

As shown in FIGS. 3A and 3B, the bearing parts A2 and B2 are supported by a pair of restricting parts 14 provided on the main body 10. The restricting parts 14 function to restrict displacement of the drive roller 51 through the bearing parts A2 and B2 in the vertical direction (as an example of a second direction).

Each restricting part 14 includes a rear part 14A extending vertically, an upper part 14B extending forward from a top edge of the rear part 14A, and a lower part 14C extending forward from a bottom edge of the rear part 14A. That is, each restricting part 14 is open at a front side thereof in the front-rear direction. The lower part 14C extends farther forward than the upper part 14B.

The upper parts 14B and corresponding lower parts 14C define vertical gaps therebetween that are slightly larger than the outer diameter of the bearing parts A2 and B2 such that the outer peripheral surfaces of the bearing parts A2 and B2 can be fitted into these gaps. With this configuration, the upper parts 14B can restrict upward movement of the respective bearing parts A2 and B2, while the lower parts 14C can restrict downward movement of the same.

The rear parts 14A function to restrict movement (displacement) of the drive roller 51 in the front-rear direction, and specifically to restrict rearward movement of the drive roller 51. The rear parts 14A are disposed rearward of and adjacent to the corresponding bearing parts A2 and B2 of the belt unit 50 when the belt unit 50 is mounted in the main body 10. However, the rear parts 14A may be disposed at a position spaced away from the bearing parts A2 and B2 of the belt unit 50 when the belt unit 50 is mounted in the main body 10, provided that the rear parts 14A are positioned near the bearing parts A2 and B2.

The body-side coupling 130 described above is disposed on the axis of the drive roller 51 whose rearward movement is restricted by the rear parts 14A.

The restricting parts 14 have a cross-sectional shape that appears like an angular "U" that has been rotated sideways. Since the bearing parts A2 and B2 can be fitted into and supported by the corresponding restricting parts 14, the belt unit 50 is allowed to pivot about the axis of the drive roller 51 during attachment and detachment of the belt unit 50 relative to the main body 10.

The engaging parts A3 and B3 are configured to engage with corresponding pressing members 110 provided in the main body 10, as shown in FIG. 3A. The pressing members 110 are arranged to interpose the belt unit 50 therebetween in the axial direction when the belt unit 50 is attached to the main body 10. The left and right pressing members 110 are an example of a moving member and examples of a first moving part and a second moving part). The engaging parts A3 and B3 are example of a trigger part. The engaging parts A3 and B3 are tapered such that their bottom ends grow gradually narrower toward the bottom. The engaging parts A3 and B3 are disposed at a position forward of the drive roller 51 by a first distance L1 and rearward of the grip parts C1 by a second distance L2 larger than the first distance L1. More specifically, the first distance L1 is the distance from the axis of the drive roller 51 (i.e., from the fulcrum point about which the belt unit 50 is caused to pivot during attachment thereof to the main body 10) to the point at which the engaging parts A3 and B3 act on the pressing members 110. The second distance L2 is the distance from this point of action to the rearmost side of the grip parts C1.

The pressing members 110 constitute part of pressing mechanisms 100 and function to press the corresponding engaging parts A3 and B3 forward toward position fixing parts 15 provided in the main body 10. The pressing members 110 can pivot between an initial position shown in FIG. 6B (as an example of a first position) and a pressing position shown in FIGS. 3A and 7B (as an example of a second position). The pressing mechanisms 100 and position fixing parts 15 are provided one each on the left and right sides of the belt unit 50. That is, the pressing mechanisms 100 are arranged to interpose the belt unit 50 therebetween in the axial direction when the belt unit 50 is attached to the main body 10. Likewise, the position fixing parts 15 are arranged to interpose the belt unit 50 therebetween in the axial direction when the belt unit 50 is attached to the main body 10. The left and right position fixing parts 15 are examples of a positioning part, a first positioning part and a second positioning part.

Each pressing member 110 includes a pivot shaft part 111, a first arm part 112, a guide part 113 and a second arm part 114. The pivot shaft part 111 is supported by the main body 10 to allow the pressing member 110 to pivotally move about the pivot shaft part 111. The first arm part 112 extends upward from the pivot shaft part 111 and configured to hold the corresponding engaging part A3 or B3 against the corresponding position fixing part 15. The guide part 113 protrudes rearward from a top end portion of the first arm part 112. The second arm part 114 extends forward from the pivot shaft part 111. The top end portion of the first arm part 112 has a front end portion that has a tapered shape that grows gradually narrower toward the respective engaging part A3 or B3.

Figure 6B:
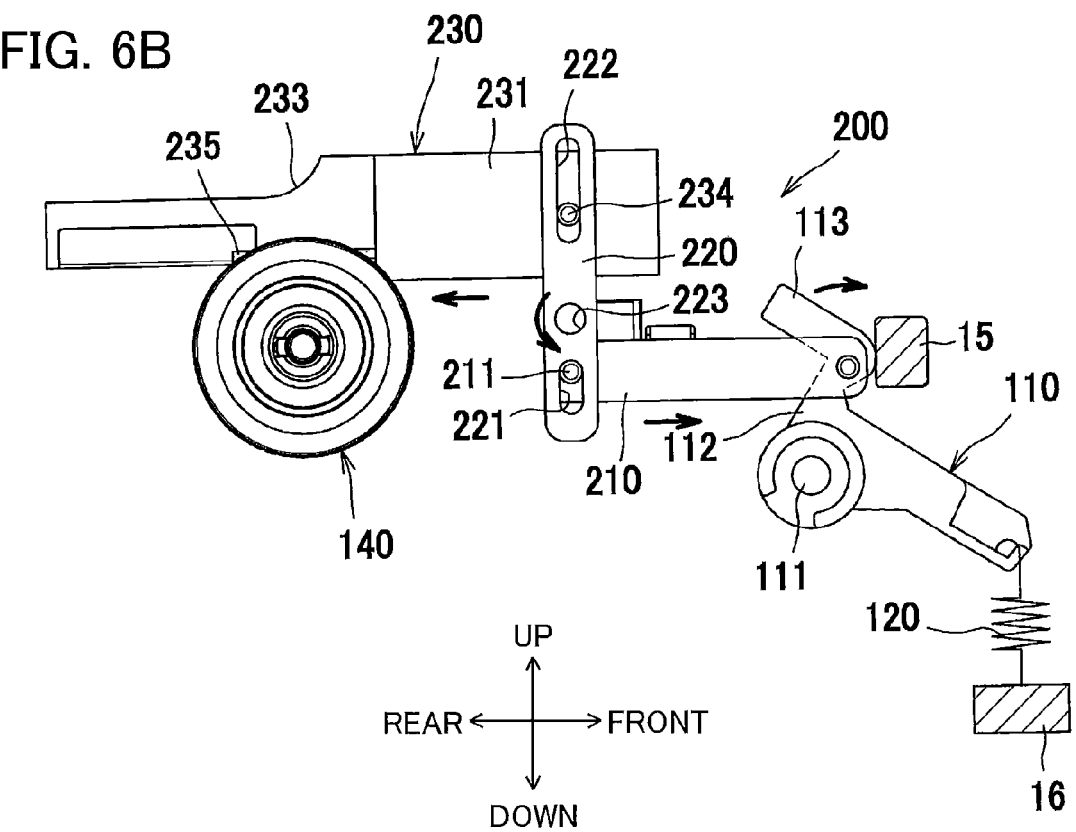
FIG. 6B is a side view of the interlocking mechanism according to the first embodiment, wherein the pressing member of the pressing mechanism is in the initial position.

When the belt unit 50 is removed from the main body 10, top surfaces of the guide parts 113 are angled relative to the horizontal plane, as shown in FIG. 6B. Specifically, the top surfaces of the guide parts 113 are sloped relative to paths defined by the corresponding engaging parts A3 and B3 while the belt unit 50 makes pivotal movement during mounting of the belt unit 50 on the main body 10. In this way, the guide parts 113 guide the corresponding engaging parts A3 and B3 while the belt unit 50 is being mounted until the engaging parts A3 and B3 become interposed between the corresponding first arm parts 112 and position fixing parts 15.

In addition to the pressing member 110, each pressing mechanism 100 includes a tension coil spring 120 as an example of an urging member, a first urging part and a second urging part. The tension coil spring 120 has one end that is engaged with a distal end of the second arm part 114 constituting the corresponding pressing member 110, while the other end of the tension coil spring 120 is engaged with a spring engaging part 16 provided in the main body 10. With this arrangement, the tension coil springs 120 can urge the corresponding pressing members 110 normally toward their initial position (shown in FIG. 6B) from the pressing position (shown in FIGS. 3 and 7B). Being urged by the tension coil springs 120, the pressing members 110 press the corresponding engaging parts A3 and B3 forward against the corresponding position fixing parts 15, thereby fixing the front-rear position of the belt unit 50. When the engaging parts A3 and B3 are removed from between the corresponding pressing members 110 and position fixing parts 15, the pressing members 110 are brought into contact with the position fixing parts 15, thereby being restricted from pivoting farther clockwise. The pressing members 110 are thus maintained in their initial position.

The supported parts A4 and B4 are supported from below by a pair of left and right support parts 17 disposed in the main body 10. The supported parts A4 and B4 are positioned between the respective engaging parts A3 and B3 and the grip parts C1 in the front-rear direction, and specifically are positioned closer to the grip parts C1. Each of the side wall parts 55A and 55B of the frame 55 is provided, on respective front ends thereof, with a bearing 52A that rotatably supports the follow roller 52, a guide hole 52B that supports the bearing 52A such that the bearing 52A can move in the front-rear direction, and a compression coil spring 52C that urges the bearing 52A forward. With this configuration, the follow roller 52 is urged in a direction away from the drive roller 51 (i.e., frontward), applying suitable tension to the conveying belt 53.

As shown in FIGS. 4 and 5, an interlocking mechanism 200 is provided on the left side of the belt unit 50 for interlocking the left pressing member 110 with the body-side coupling 130. The interlocking mechanism 200 includes a first link 210 coupled to the left pressing member 110, a second link 220 coupled to the first link 210, and a third link 230 coupled to the second link 220. The third link 230 also has a cam 235 for pressing the body-side coupling 130 leftward.

As shown in FIGS. 6A through 7B, the first link 210 is an elongated member extending in the front-rear direction. The first link 210 has a front end that is pivotably coupled to the top end portion of the first arm part 112 constituting the pressing member 110. The first link 210 is also supported by a guide (not shown) provided in the main body 10 so as to be capable of moving in the front-rear direction. With this configuration, the left pressing member 110 is configured to press the first link 210 rearward so that the first link 210 can move rearward when the pressing member 110 pivots from the initial position to the pressing position, and the left pressing member 110 pulls the first link 210 forward when pivoting from the pressing position to the initial position. A first coupling shaft 211 is provided on a rear end portion of the first link 210 for coupling with the second link 220.

The second link 220 is an elongated member that extends vertically when the pressing member 110 is in its initial position. The second link 220 has a bottom end portion formed with a first elongate hole 221 for engaging with the first coupling shaft 211. The second link 220 has a top end portion in which a second elongate hole 222 is formed for engaging with a second coupling shaft 234 provided on the third link 230 described later. The second link 220 is also formed with a support hole 223 between the first elongate hole 221 and second elongate hole 222, for enabling the second link 220 to be pivotably supported on a support shaft (not shown) provided in the main body 10.

Figure 7A:
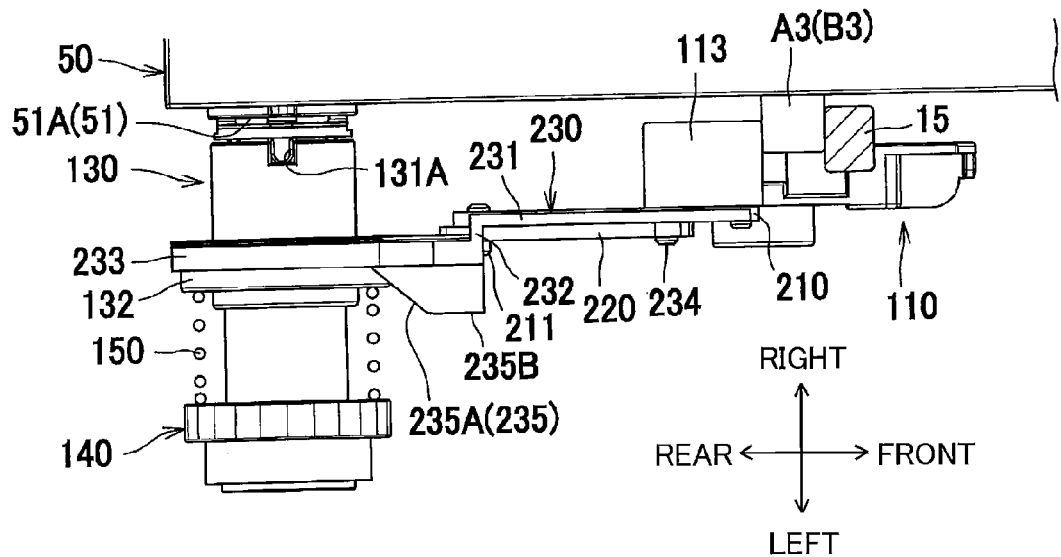
FIG. 7A is a top view of the interlocking mechanism according to the first embodiment, wherein the pressing member of the pressing mechanism is in the pressing position.
Figure 7B:
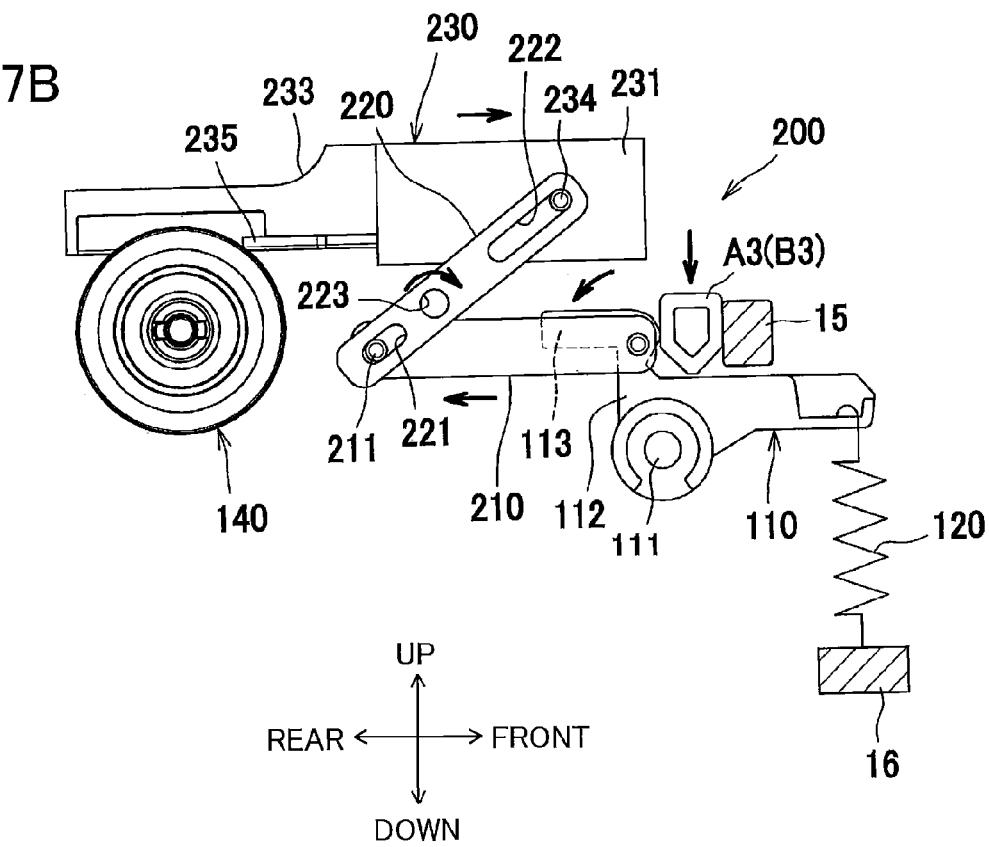
FIG. 7B is a side view of the interlocking mechanism according to the first embodiment, wherein the pressing member of the pressing mechanism is in the pressing position.

With this configuration, the first link 210 is configured to press the bottom end portion of the second link 220 rearward when the first link 210 moves rearward so that the second link 220 can pivot clockwise as shown in FIG. 7B. Conversely, the first link 210 is configured to pull the bottom end portion of the second link 220 forward when moving in the forward direction so that the second link 220 can pivot counterclockwise as shown in FIG. 6B.

The third link 230 is an elongated member that extends in the front-rear direction. The third link 230 is supported by a guide (not shown) provided in the main body 10 so as to be capable of moving in the front-rear direction. The third link 230 has a first segment 231 elongated in the front-rear direction, a second segment 232 extending leftward from a rear edge of the first segment 231, and a third segment 233 extending rearward from a left edge of the second segment 232.

The first segment 231 has a front end portion on which the second coupling shaft 234 is provided for engaging in the second elongate hole 222 of the second link 220. With this configuration, the second link 220 can pull the third link 230 forward when pivoting clockwise as shown in FIG. 7B and push the third link 230 rearward when pivoting counterclockwise as shown in FIG. 6B.

The cam 235 is provided on a front end portion of the third segment 233 and protrudes leftward therefrom. The cam 235 has a rear surface serving as a cam surface 235A that slopes relative to the left-right direction. More specifically, the cam surface 235A slopes leftward toward the front side for pushing the flange 132 of the body-side coupling 130 leftward when the cam 235 moves rearward in order to move the body-side coupling 130 into the interrupting position. The cam 235 has a left surface serving as a retaining surface 235B configured to retain the body-side coupling 130 in the interrupting position by supporting the flange 132 of the body-side coupling 130.

Next, operations of the interlocking mechanism 200 will be described.

Figure 8:
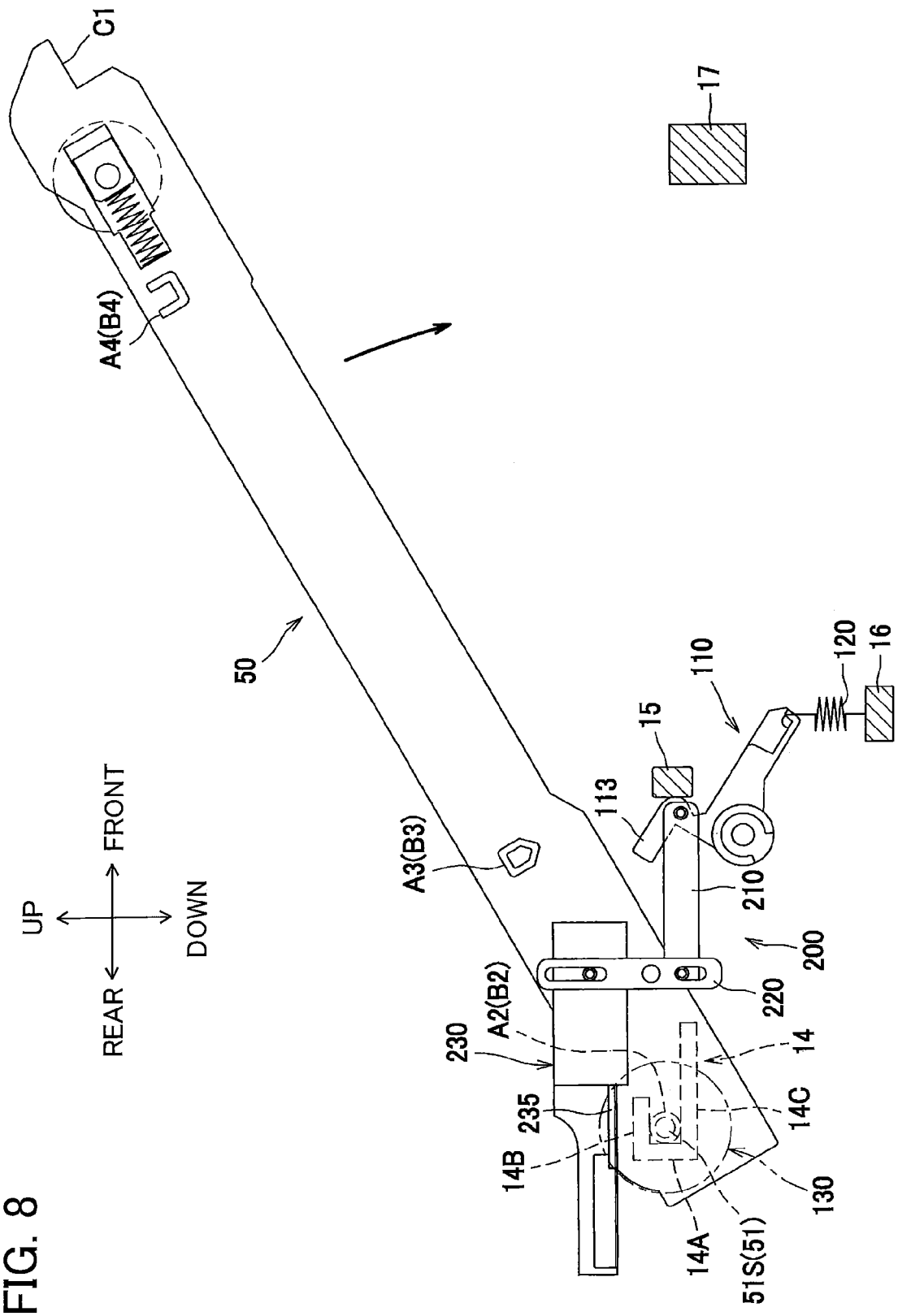
FIG. 8 is a side view explaining how the belt unit according to the first embodiment is pivoted to be mounted in the main body.

When attaching the belt unit 50 to the main body 10, the user grips the grip parts C1 and inserts the belt unit 50 into the main body 10, as shown in FIG. 8. The user lowers the rear end of the belt unit 50 to a prescribed position in the main body 10 until the bearing parts A2 and B2 are resting on the lower parts 14C of the corresponding restricting parts 14. Next, the user pushes the rear end of the belt unit 50 rearward while sliding the bearing parts A2 and B2 over the lower parts 14C, inserting the bearing parts A2 and B2 between the corresponding upper parts 14B and lower parts 14C. Once the bearing parts A2 and B2 contact the rear parts 14A, the rear parts 14A restrict the bearing parts A2 and B2 from moving further rearward.

Subsequently, the user pivotally moves the front end of the belt unit 50 downward about the axis of the drive roller 51. At this time, the engaging parts A3 and B3 contact the corresponding guide parts 113 of the pressing members 110. By pushing the grip parts C1 further downward, the engaging parts A3 and B3 press the guide parts 113 of the pressing members 110 rearward against the urging force of the tension coil springs 120. Consequently, the pressing members 110 pivot from the initial position shown in FIG. 8 toward the pressing position shown in FIGS. 7A and B until the engaging parts A3 and B3 are inserted between the corresponding pressing members 110 and position fixing parts 15. At this time, the engaging parts A3 and B3 are pressed against the position fixing parts 15, thereby fixing the front-rear position of the belt unit 50. Note, by setting the second distance L2 between the grip parts C1 and the engaging parts A3 and B3 greater than the first distance L1 from the drive roller 51 to the engaging parts A3 and B3, a lever effect can be utilized so that the user need only apply a small amount of force to the grip parts C1 in order to push the engaging parts A3 and B3 between the corresponding pressing members 110 and position fixing parts 15.

Further, when the left pressing member 110 pivots from the initial position to the pressing position, the first link 210 moves rearward, causing the second link 220 to pivot clockwise in FIG. 8 and the third link 230 to move forward. Consequently, the retaining surface 235B of the cam 235 slides off the flange 132 of the body-side coupling 130, and the biasing force of the compression coil spring 150 moves the body-side coupling 130 from the interrupting position to the transmitting position, at which time the body-side coupling 130 is coupled to the belt-side coupling 51A.

At about the same time that the engaging parts A3 and B3 enter between the corresponding pressing members 110 and position fixing parts 15, the supported parts A4 and B4 come to a rest on the corresponding support parts 17, as illustrated in FIG. 3. Therefore, both front and rear ends of the belt unit 50 are supported from below by the lower parts 14C of the restricting parts 14 and the support parts 17.

When removing the belt unit 50 from the main body 10, first the user grips the grip parts C1 and lifts the front end of the belt unit 50 upward so that the belt unit 50 pivots about the axis of the drive roller 51. At this time, the engaging parts A3 and B3 are extracted from between the pressing members 110 and position fixing parts 15, and the urging force of the tension coil springs 120 causes the pressing members 110 to pivot clockwise in FIG. 6B from the pressing position to the initial position.

At this time, the first link 210 moves forward, causing the second link 220 to pivot counterclockwise in FIG. 6B and moving the third link 230 rearward. Consequently, the cam surface 235A of the cam 235 pushes the flange 132 of the body-side coupling 130 leftward. The body-side coupling 130 therefore moves from its transmitting position to its interrupting position against the biasing force of the compression coil spring 150 and, hence, is retracted from the belt-side coupling 51A. Subsequently, the user pulls the bearing parts A2 and B2 out of the corresponding restricting parts 14 to complete removal of the belt unit 50 from the main body 10.

The color printer 1 according to the first embodiment described above can obtain the following operational and technical advantages.

The body-side coupling 130 is configured to move in order to couple with or uncouple from the belt-side coupling 51A only when the belt unit 50 is mounted in and removed from the main body 10. Accordingly, unlike a conventional configuration in which an input-side coupling is advanced and retracted in association with opening and closing of a front cover, the body-side coupling 130 is prevented from coupling with and uncoupling from the belt-side coupling 51A, except when the belt unit 50 is mounted and removed relative to the main body 10.

By providing the tension coil springs 120 for urging the pressing members 110 from their pressing position toward their initial position, the tension coil springs 120 can effectively return the pressing members 110 to their initial positions.

Since the tension coil springs 120 used for operating the interlocking mechanism 200 are also used for positioning the belt unit 50, this arrangement reduces the number of required parts.

The belt unit 50 can be effectively positioned by providing the position fixing parts 15, pressing members 110, and tension coil springs 120 on both left and right sides of the belt unit 50. By interlocking only one of the pressing members 110 with the interlocking mechanism 200, the structure of the first embodiment is simpler than a structure that interlocks both pressing members with interlocking mechanisms, for example.

By providing the body-side coupling 130, which is a movable part of the coupling CP, in the main body 10, the structure of the belt unit 50 in the present embodiment can be made simpler than a structure that provides the movable part on the belt unit, for example, thereby facilitating the attaching and detaching operations for the belt unit 50. Further, when the belt unit 50 is designed as a replaceable part, the cost of replaceable parts can be reduced.

The restricting parts 14 provided for restricting the vertical displacement of the drive roller 51 can restrain fluctuations in the vertical position of the drive roller 51 when the color printer 1 incurs external disturbances, such as vibrations or impacts. Accordingly, the color printer 1 according to the first embodiment can ensure more stable behavior of the conveying belt 53, suppressing irregularities in printed positions of images.

When pivoting the belt unit 50 about the axis of the drive roller 51, the bearing parts A2 and B2 that may have a tendency to move rearward are restrained from moving rearward by the restricting parts 14, thereby suppressing changes in the front-rear position of the drive roller 51 when the belt unit 50 is pivoted. Further, the body-side coupling 130 is provided along the axis of the drive roller 51 whose movement in the vertical and rearward directions is restrained by contact between the restricting parts 14 and the bearing parts A2 and B2. Since the body-side coupling 130 is advanced toward and retracted from the drive roller 51 whose position changes very little, the body-side coupling 130 can be effectively coupled with and uncoupled from the drive roller 51.

Since the second distance L2 from the grip parts C1 to the engaging parts A3 and B3 is greater than the first distance L1 from the drive roller 51 to the engaging parts A3 and B3, the pressing members 110 can be more effectively operated than a structure whose distance from the drive roller to the engaging parts is greater than the distance from the engaging parts to the grip parts. This is because the engaging parts A3 and B3 at the point of action can apply a sufficiently large force to the pressing members 110, even when very little force is applied to the grip parts C1 at the point of effort 2. Variations to the First Embodiment While the pressing members 110 that fix the position of the belt unit 50 serve as an example of the moving member in the first embodiment described above, the present disclosure is not limited to this configuration. Any member that engages and moves with the belt unit 50 when the belt unit 50 is mounted in and removed from the main body 10 may serve as the moving member. Further, the moving members do not need to be members that move through an engagement with the belt unit 50, but may be members that are moved due to a user's operation or the like when the user mounts or removes the belt unit 50.

Figure 9:
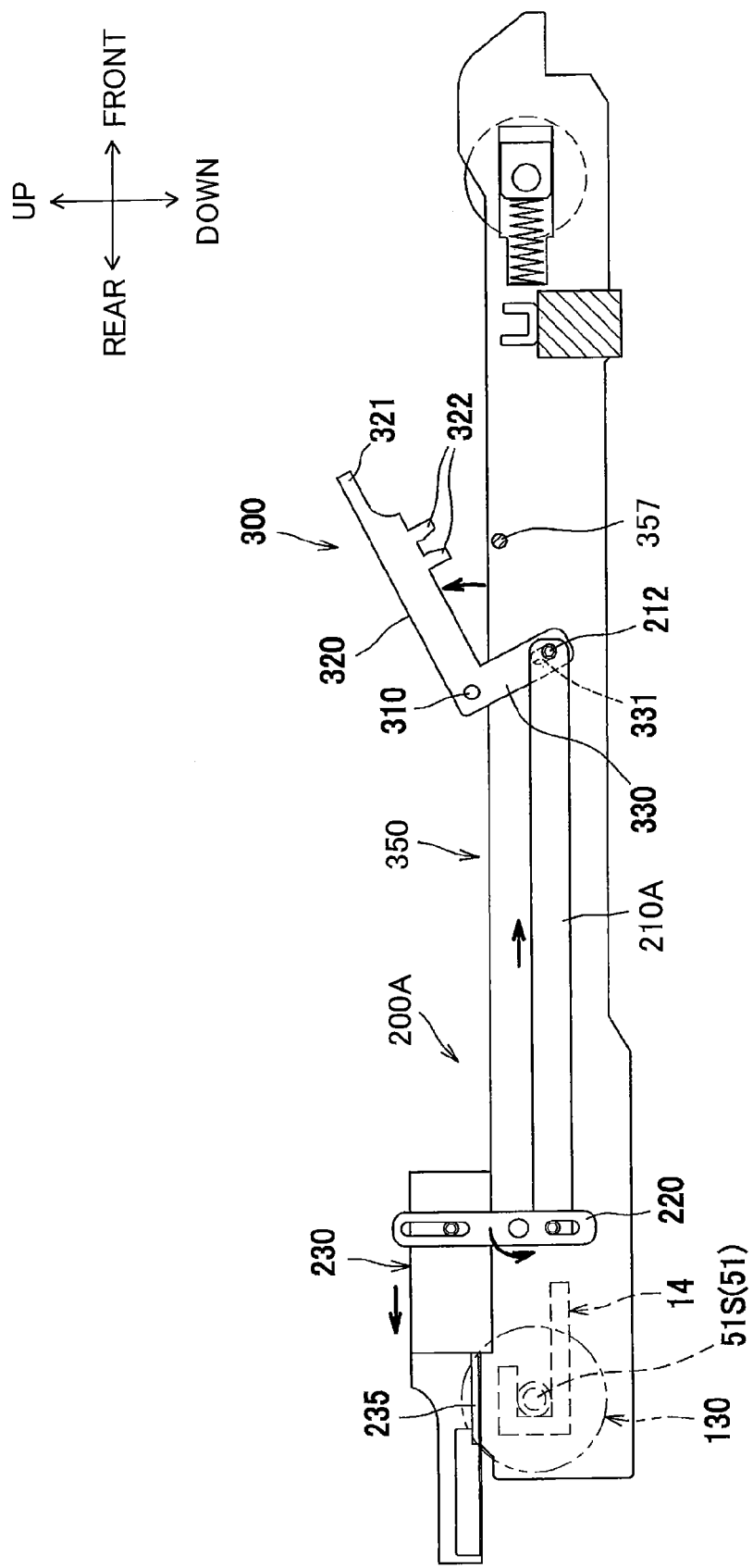
FIG. 9 is a side view illustrating a locking member according to a variation of the first embodiment, wherein the locking member is in a release position.
Figure 10:
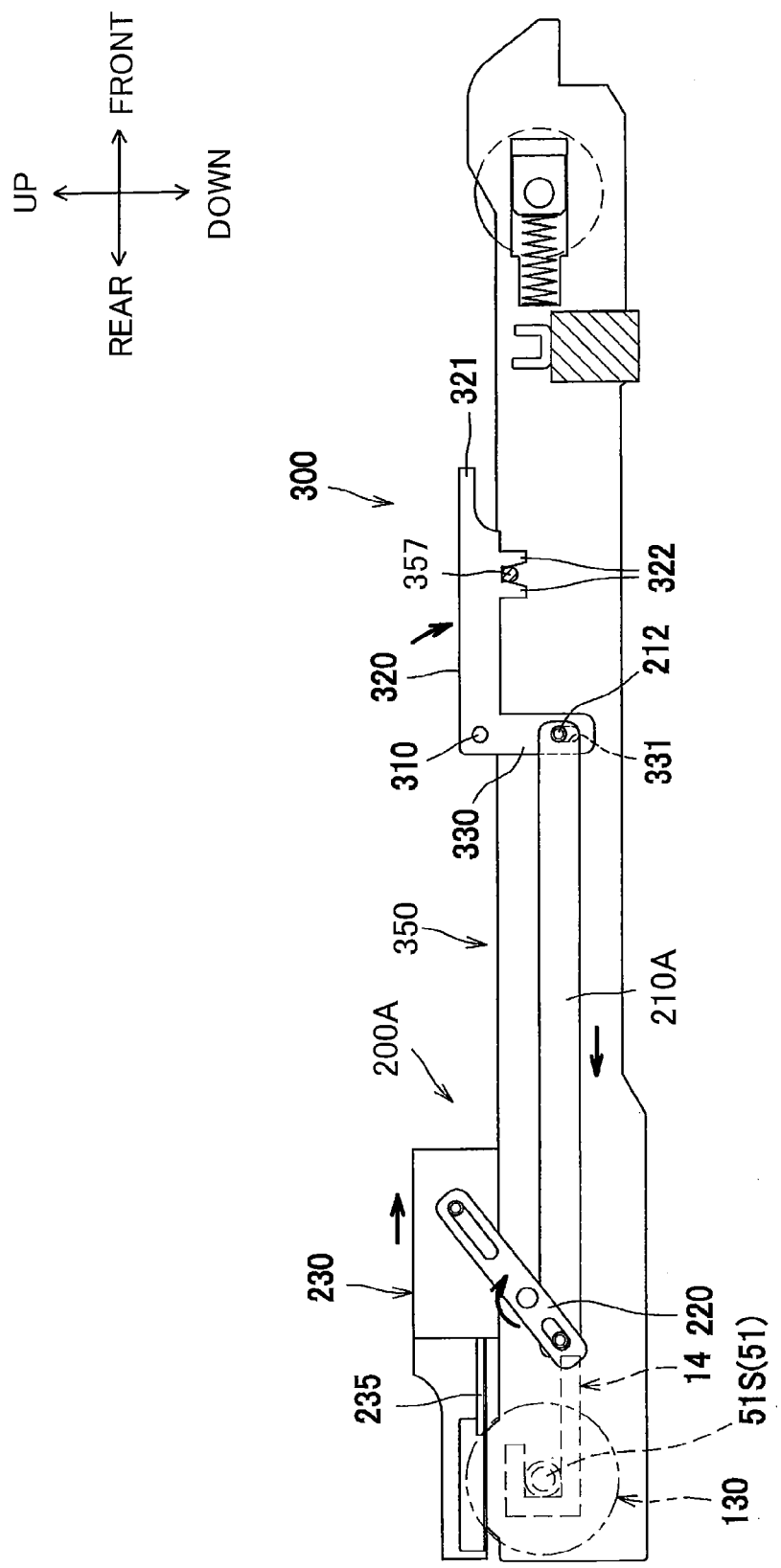
FIG. 10 is a side view illustrating the locking member according to the variation of the first embodiment, wherein the locking member is in a restricting position.

For example, FIGS. 9 and 10 show a locking member 300 according to a variation of the first embodiment as another example of the moving member. The locking member 300 of this variation is configured to lock the position of a belt unit 350 mounted in the main body 10. The locking member 300 of this variation also serves as the trigger part. In FIGS. 9 and 10, like parts and components are designated with the same reference numerals as the first embodiment.

Specifically, in this variation, the locking member 300 is configured to pivot between a restricting position (the position in FIG. 10) in which the locking member 300 is engaged with the belt unit 350 attached to the main body 10 and restricts movement (displacement) of the belt unit 350, and a release position (the position in FIG. 9) in which the locking member 300 does not restrict movement of the belt unit 350 to allow detachment of the belt unit 350 from the main body 10.

More specifically, the locking member 300 is provided leftward of the belt unit 350 and is positioned closer to the front side of the belt unit 350 than the rear side. The locking member 300 includes a pivot shaft part 310 supported in the main body 10, a first extension part 320 that extends forward from the pivot shaft part 310 when the locking member 300 is in the restricting position, and a second extension part 330 that extends downward from the pivot shaft part 310 when the locking member 300 is in the restricting position. The locking member 300 is configured to pivotally move about the pivot shaft part 310.

The first extension part 320 is provided with an operating part 321, and a pair of engaging protrusions 322. The operating part 321 is provided on a front end of the first extension part 320 and is operated by the user. The engaging protrusions 322 are formed rearward and downward of the operating part 321. The engaging protrusions 322 are capable of engaging with a pin 357 (an example of an engaged part) provided on the belt unit 350. An elongate hole 331 is formed in a bottom end of the second extension part 330. The elongate hole 331 engages with a coupling shaft 212 provided on a front end portion of a first link 210A of an interlocking mechanism 200A. In this variation, the first link 210A extends further forward than the first link 210 of the first embodiment.

By coupling the locking member 300 to the first link 210A in this way, the body-side coupling 130 can move in association with the locking member 300 via the interlocking mechanism 200A. Specifically, when the locking member 300 is moved from the release position to the restricting position, the cam 235 moves off the body-side coupling 130, allowing the body-side coupling 130 to move from its interrupting position to its transmitting position through the biasing force of the compression coil spring 150. When the locking member 300 moves from the restricting position to the release position, the cam 235 (retaining surface 235B) presses the body-side coupling 130 leftward against the biasing force of the compression coil spring 150, moving the body-side coupling 130 from the transmitting position to the interrupting position.

Here, a holding part (not shown) may also be provided for holding the locking member 300 in either the release position or the restricting position. For example, a shallow recessed part may be formed in one of the locking member 300 and main body 10, while a protruding part that protrudes slightly and is capable of engaging in the recessed part may be provided on a remaining one of the locking member 300 and main body 10. The locking member 300 may be held in either the release position or the restricting position through the engagement of the protruding part and recessed part, and the engagement between the protruding part and recessed part may be broken when the user applies force to the locking member 300.

With the construction of the variation described above, the belt unit 350 can be mounted in and removed from the main body 10 when the locking member 300 is in the release position, but cannot be mounted or removed when the locking member 300 is in the restricting position because movement of the belt unit 350 is restricted by the engagement of the engaging protrusions 322 and the pin 357. Normally, the user operates the locking member 300 only when mounting and removing the belt unit 350. Since the body-side coupling 130 in this construction is coupled with or uncoupled from the belt-side coupling 51A when the locking member 300 is operated through a normal user operation and only when the user is mounting or removing the belt unit 350, the body-side coupling 130 is prevented from coupling with or uncoupling from the belt-side coupling 51A except when mounting or removing the belt unit 350, unlike the conventional structure in which the movable part of the coupling is advanced or retracted in association with the movement of the front cover.

Incidentally, the moving member may be configured to move linearly, for example, and does not need to pivot like the pressing members 110 of the first embodiment and the locking member 300 of the variation described above.

3. Second Embodiment

Next, a color printer 1A according to a second embodiment will be described with reference to FIGS. 11 through 15B, wherein like parts and components are designated with the same reference numerals as the first embodiment in order to avoid duplicating explanation. The color printer 1A of the second embodiment has a similar structure as that of the color printer 1 of the first embodiment, but is provided with an interlocking mechanism 400, instead of the interlocking mechanism 200.

The interlocking mechanism 200 of the first embodiment is configured to associate the movement of the body-side coupling 130 with attachment and detachment of the belt unit 50 relative to the main body 10. On the other hand, the interlocking mechanism 400 of the second embodiment is configured to associate the movement of the body-side coupling 130 with attachment and detachment of the holder 42 relative to the main body 10.

In the second embodiment, when accommodated in the main body 10, the holder 42 is configured to move vertically between a first position (the state shown in FIG. 1) in which the photosensitive drums 43 are in contact with the conveying belt 53, and a second position (the state shown in FIG. 11) in which the photosensitive drums 43 are separated from the conveying belt 53. Here, the vertical direction (upward and downward direction) is an example of a second direction. Further, as in the first embodiment, the holder 42 can move in the front-rear direction between the second position and a fifth position shown in FIG. 12. This fifth position corresponds to the removed position in the first embodiment. In the fifth position, nearly an entire top portion of the holder 42 (the portion corresponding to the process units 41) is exposed outside the main body 10.

The holder 42 can be removed from the main body 10 after being placed at the fifth position.

Here, movement of the holder 42 from the first position to the fifth position is facilitated by guides (not shown) provided in left and right frames constituting the main body 10. Note that while the holder 42 moves vertically between the first and second positions in the second embodiment, the holder 42 may be configured to move in a direction slightly sloped relative to the vertical direction, i.e., in a direction that includes both a vertical component and a front-rear component.

The holder 42 includes a pair of (left and right) side walls 42A. An engaging protrusion 42B is provided on the left side wall 42A, i.e., the side wall 42A on the body-side coupling 130 side, as illustrated in FIG. 13A. The engaging protrusion 42B protrudes leftward from an outer surface of the left side wall 42A for engaging with the interlocking mechanism 400. The engaging protrusion 42B serves as the trigger part in the second embodiment. The interlocking mechanism 400 is provided on the left side (one side in the left-right direction) of the belt unit 50 for interlocking the holder 42 (engaging protrusion 42B) with the body-side coupling 130.

Specifically, referring to FIG. 13B, the engaging protrusion 42B has a bottom portion serving as a first engaging part 42C that engages with the interlocking mechanism 400 when the holder 42 moves from the second position to the first position. The engaging protrusion 42B has a top portion serving as a second engaging part 42D that engages with the interlocking mechanism 400 when the holder 42 moves from the first position to the second position. That is, the first engaging part 42C and second engaging part 42D constituting the engaging protrusion 42B also serve as the trigger part. Further, the left and right side walls 42A of the holder 42 have bottom surfaces 42E. Two protruding parts 42F are formed on the bottom surfaces 42E of both side walls 42A at both front and rear ends thereof, for a total of four protruding parts 42F. The protruding parts 42F protrude downward from the bottom surfaces 42E. Each protruding part 42F has a bottom surface serving as a contact surface 42G configured to contact a mounting surface (not shown) formed in the color printer 401 for placing the holder 42 thereon mounted in the main body 10 (also see FIG. 11).

The contact surfaces 42G are arranged below the photosensitive drums 43, i.e., on the belt unit 50 side of the photosensitive drums 43. That is, the contact surfaces 42G are arranged closer to the belt unit 50 than the photosensitive drums 43 are to the belt unit 50. The engaging protrusion 42B is arranged above the contact surfaces 42G, i.e., on the photosensitive drum 43 side of the contact surfaces 42G. That is, the engaging protrusions 42B are arranged closer to the photosensitive drums 43 than the contact surfaces 42G are to the photosensitive drums 43.

As shown in FIG. 13A, the interlocking mechanism 400 is provided on the left side of the belt unit 50 for engaging with the engaging protrusion 42B of the holder 42. The interlocking mechanism 400 includes a first link 410 to be coupled to the engaging protrusion 42B, a second link 420 coupled to the first link 410, and a third link 430 coupled to the second link 420. The third link 430 is provided with a cam 435 for pressing the body-side coupling 130 leftward.

Figure 14A:
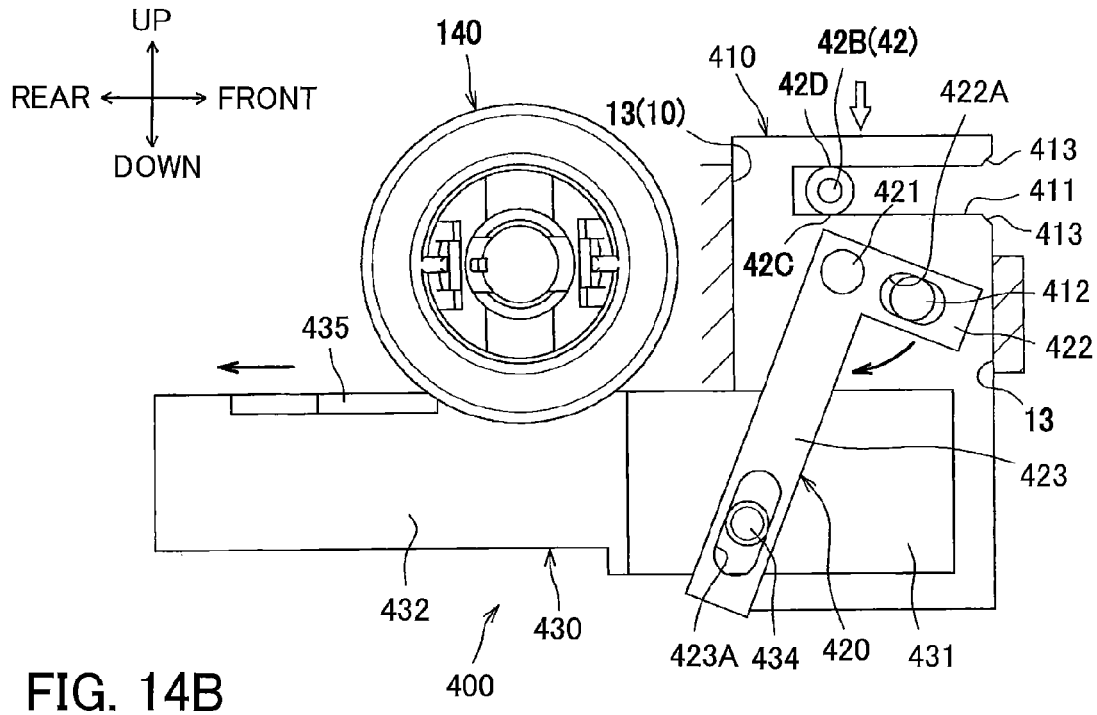
FIG. 14A is a side view illustrating an interlocking mechanism according to the second embodiment, wherein the holder is in a first position.
Figure 15A:
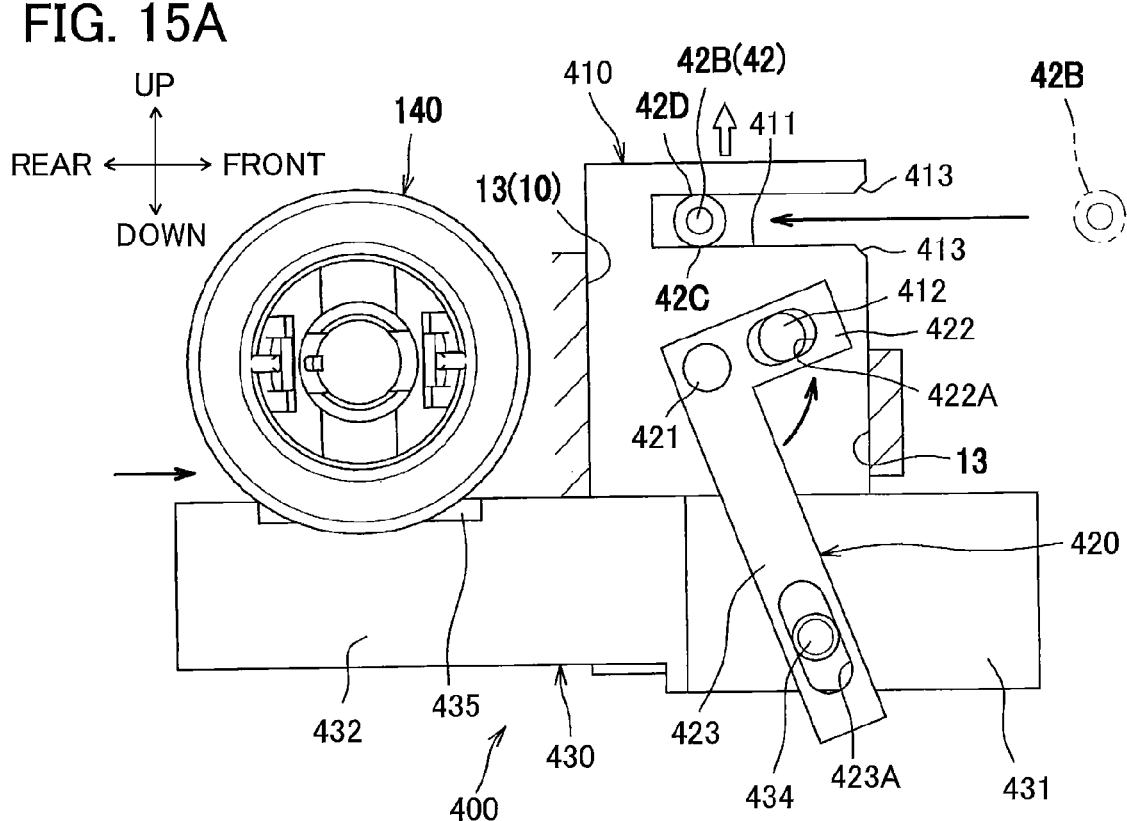
FIG. 15A is a side view illustrating the interlocking mechanism according to the second embodiment, wherein the holder is in the second position.

More specifically, as shown in FIGS. 14A and 15A, the first link 410 is an elongated member extending in the vertical direction and is supported on the main body 10 so as to be capable of moving vertically. More specifically, the main body 10 includes a pair of guide parts 13 (an example of a holding part) configured to interpose the first link 410 therebetween in the front-rear direction to hold the first link 410. The first link 410 has a front-rear width slightly larger than a distance between the pair of guide parts 13 in the front-rear direction. Hence, when an external force is not being applied to the first link 410, the first link 410 is maintained at its vertical position by friction with the pair of guide parts 13. When an external force is applied to the first link 410, the first link 410 is moved vertically while being supported by the guide parts 13.

The first link 410 has an upper end portion in which a slit 411 is formed to extend in the front-rear direction. The slit 411 is open on its front end, allowing the engaging protrusion 42B to be inserted thereinto. When the holder 42 is lowered from the second position (see FIG. 15A) to the first position (see FIG. 14A), the first engaging part 42C of the engaging protrusion 42B presses against a bottom surface of the slit 411 so that the first link 410 is lowered together with the holder 42 to its third position corresponding to the first position of the holder 42 (shown in FIGS. 14A and 14B). Thus, when the holder 42 is supported in its first position by the main body 10, the first link 410 is held in its third position by the guide parts 13.

Figure 15B:
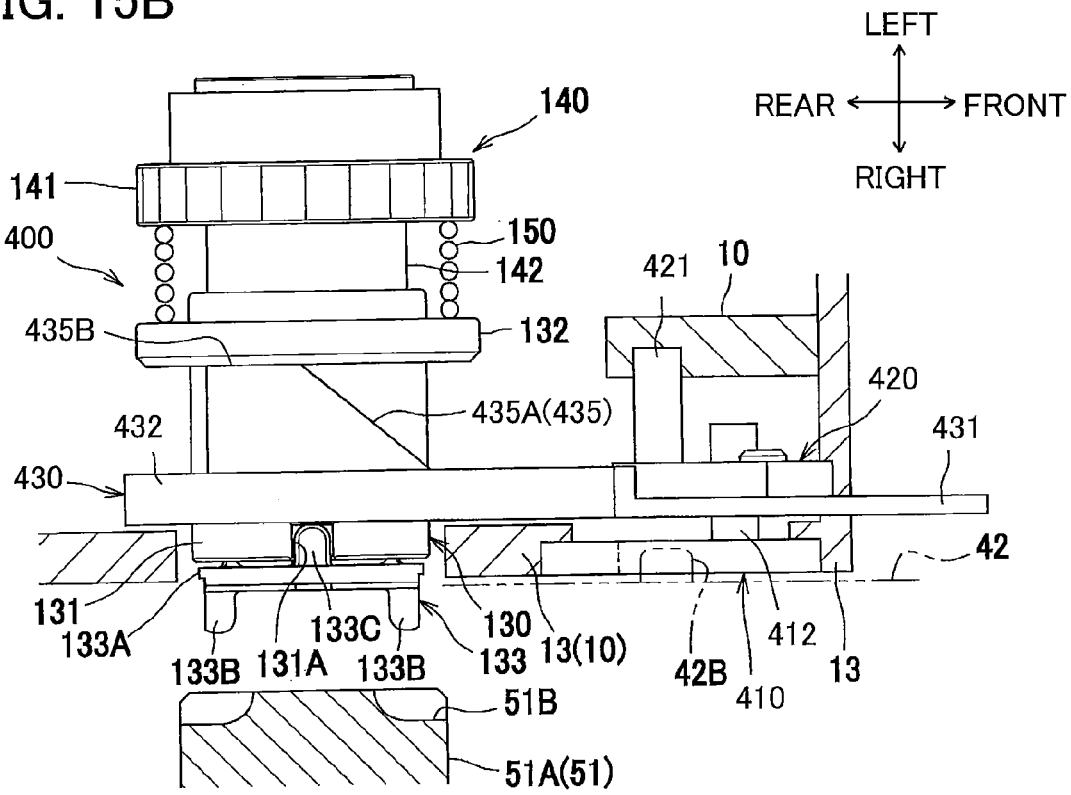
FIG. 15B is a bottom view illustrating the interlocking mechanism according to the second embodiment, wherein the holder is in the second position.

Similarly, when the holder 42 is raised from the first position to the second position, the second engaging part 42D of the engaging protrusion 42B presses against a top surface of the slit 411 so that the first link 410 rises together with the holder 42, moving to its fourth position corresponding to the second position of the holder 42, as shown in FIGS. 15A and 15B. When the holder 42 is subsequently moved from the second position to the fifth position and the engaging protrusion 42B is extracted from the slit 411, the guide parts 13 maintain the first link 410 in the fourth position.

The first link 410 also includes a first coupling shaft 412 positioned below the slit 411 for coupling with the second link 420. A pair of guide surfaces 413 is formed on front edges of the slit 411 that define the opening of the slit 411. The guide surfaces 413 slope respectively upward and rearward toward the front side for expanding the opening of the slit 411 vertically and function to guide insertion of the engaging protrusion 42B into the slit 411.

The second link 420 is an L-shaped member configured of a pivot shaft part 421, a first extension part 422 and a second extension part 423. The pivot shaft part 421 is provided at a corner portion of the "L" shape of the second link 420. The pivot shaft part 421 is supported by the main body 10 to permit the second link 420 to pivot about the pivot shaft part 421. The first extension part 422 extends diagonally downward and forward from the pivot shaft part 421 when the holder 42 is in the first position (see FIG. 14A). The second extension part 423 extends diagonally downward and rearward from the pivot shaft part 421 when the holder 42 is in the first position. The first extension part 422 is formed with a first elongate hole 422A for engaging with the first coupling shaft 412 of the first link 410. The second extension part 423 has a lower end portion in which a second elongate hole 423A is formed for engaging with a second coupling shaft 434 provided on the third link 430 described later.

With this configuration, the first link 410 presses the first extension part 422 of the second link 420 downward when moving downward, causing the second link 420 to pivot clockwise as shown in FIG. 14A. When the first link 410 moves upward, the first link 410 pulls the first extension part 422 of the second link 420 upward, causing the second link 420 to pivot counterclockwise as shown in FIG. 15A.

The third link 430 is supported in the main body 10 so as to be capable of moving in the front-rear direction. The third link 430 primarily includes a first segment 431 elongated in the front-rear direction, and a second segment 432 that extends rearward from a rear end of the first segment 431. The second segment 432 has a thicker left-right dimension than the first segment 431 (see FIGS. 14B and 15B).

The second coupling shaft 434 is provided on the first segment 431 for engaging in the second elongate hole 423A of the second link 420. With this configuration, the second link 420 can push the third link 430 rearward when pivoting clockwise as shown in FIG. 14A, and can pull the third link 430 forward when pivoting counterclockwise as shown in FIG. 15A.

The cam 435 is provided on a rear portion of the second segment 432 and protrudes leftward therefrom. The cam 435 has a front surface serving as a cam surface 435A that slopes relative to the left-right direction. More specifically, the cam surface 435A slopes leftward toward the rear side for pushing the flange 132 of the body-side coupling 130 leftward when the cam 435 moves frontward in order to move the body-side coupling 130 into the interrupting position. The cam 435 has a left surface serving as a retaining surface 435B configured to retain the body-side coupling 130 in the interrupting position by supporting the flange 132 of the body-side coupling 130.

Next, operations of the interlocking mechanism 400 according to the second embodiment will be described.

Figure 11:
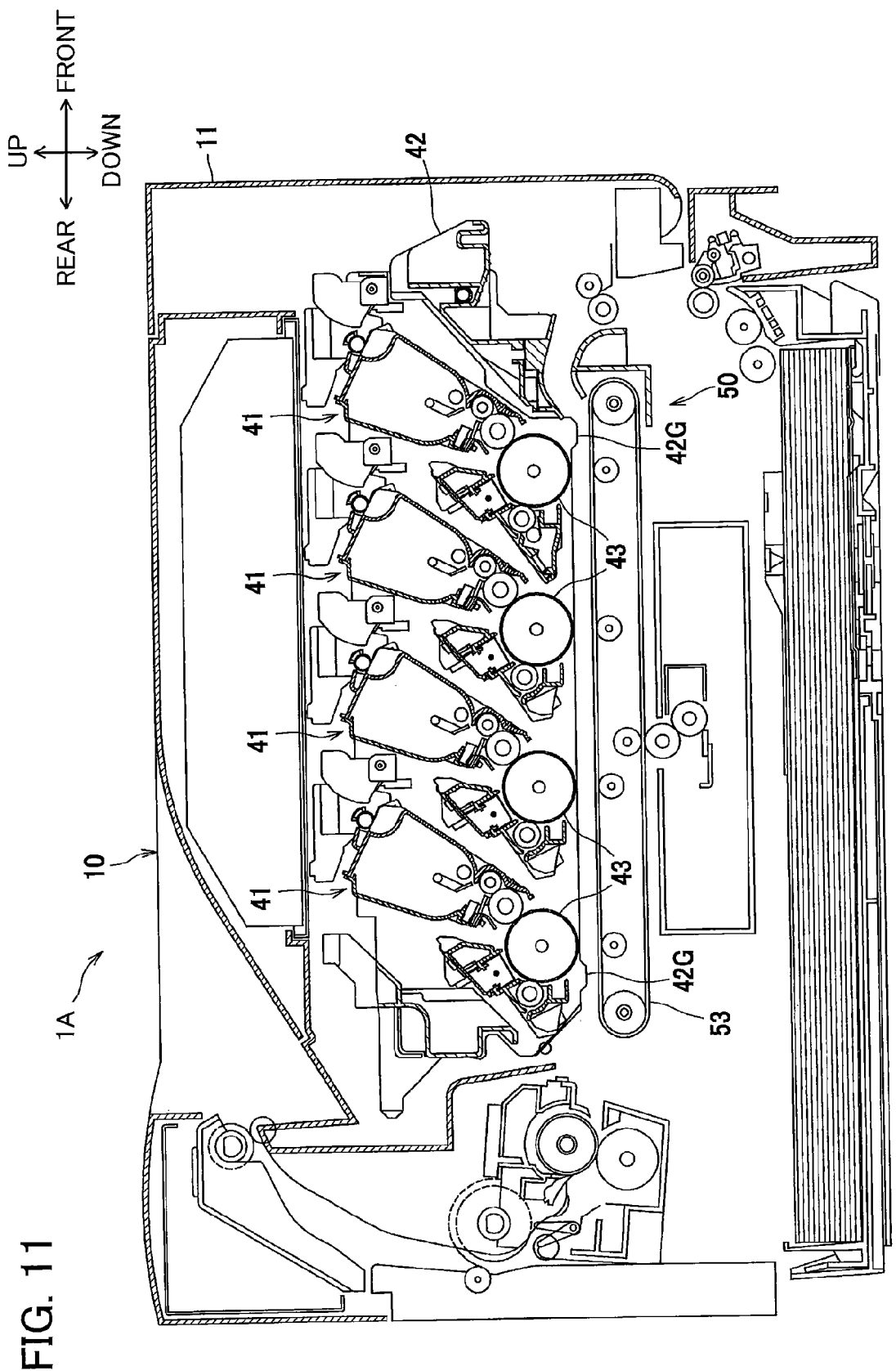
FIG. 11 is a cross-sectional view showing a general construction of a color printer according to a second embodiment, wherein a holder is in a second position.
Figure 12:
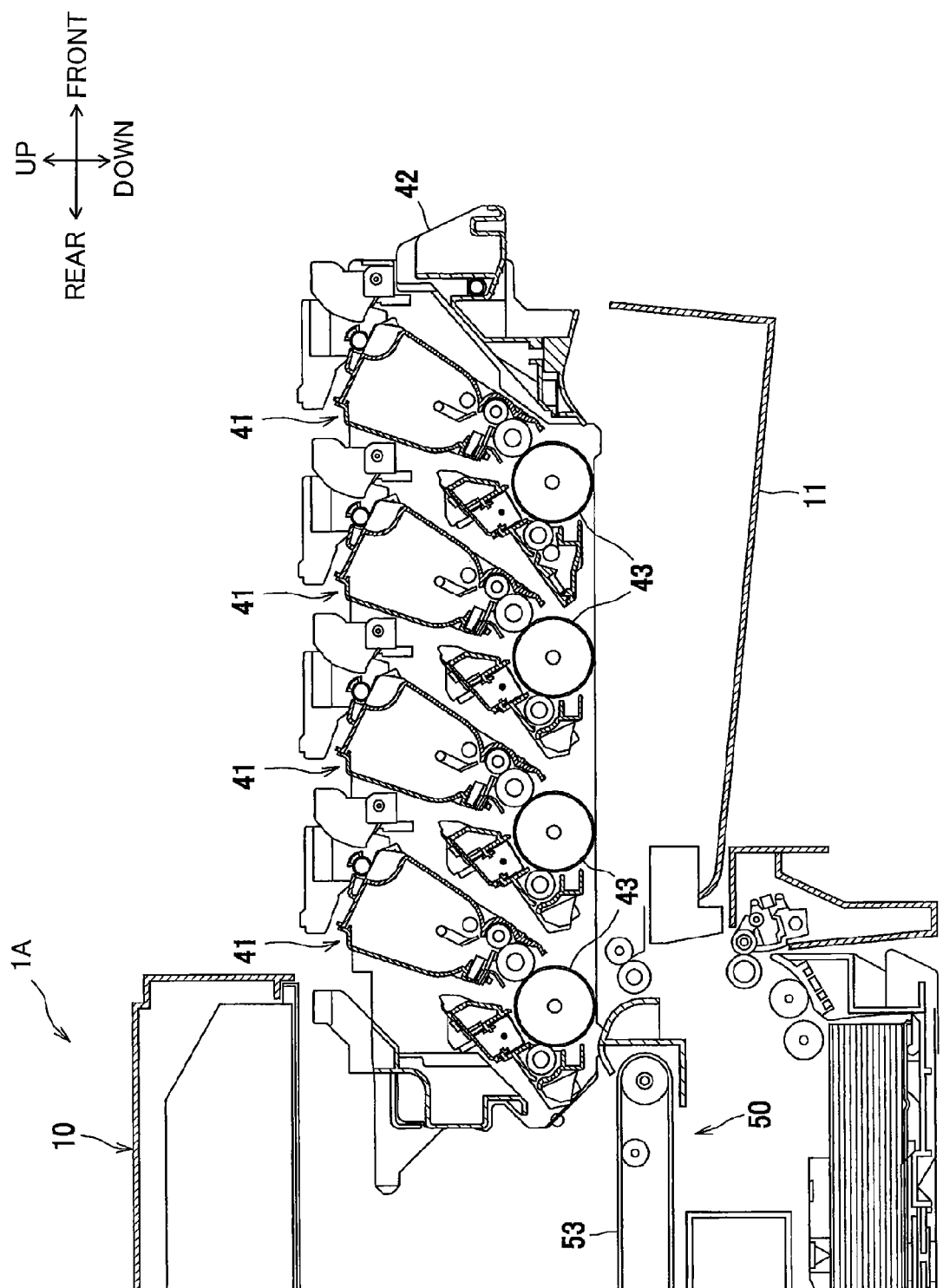
FIG. 12 is a partially enlarged cross-sectional view of the color printer according to the second embodiment, wherein the holder is in a fifth position.

To mount the holder 42 in the main body 10, the user first moves the holder 42 from its fifth position (shown in FIG. 12) to the second position (shown in FIG. 11). Through this operation, the engaging protrusion 42B of the holder 42 becomes inserted in the slit 411 formed in the first link 410, as shown in FIG. 15A.

Figure 14B:
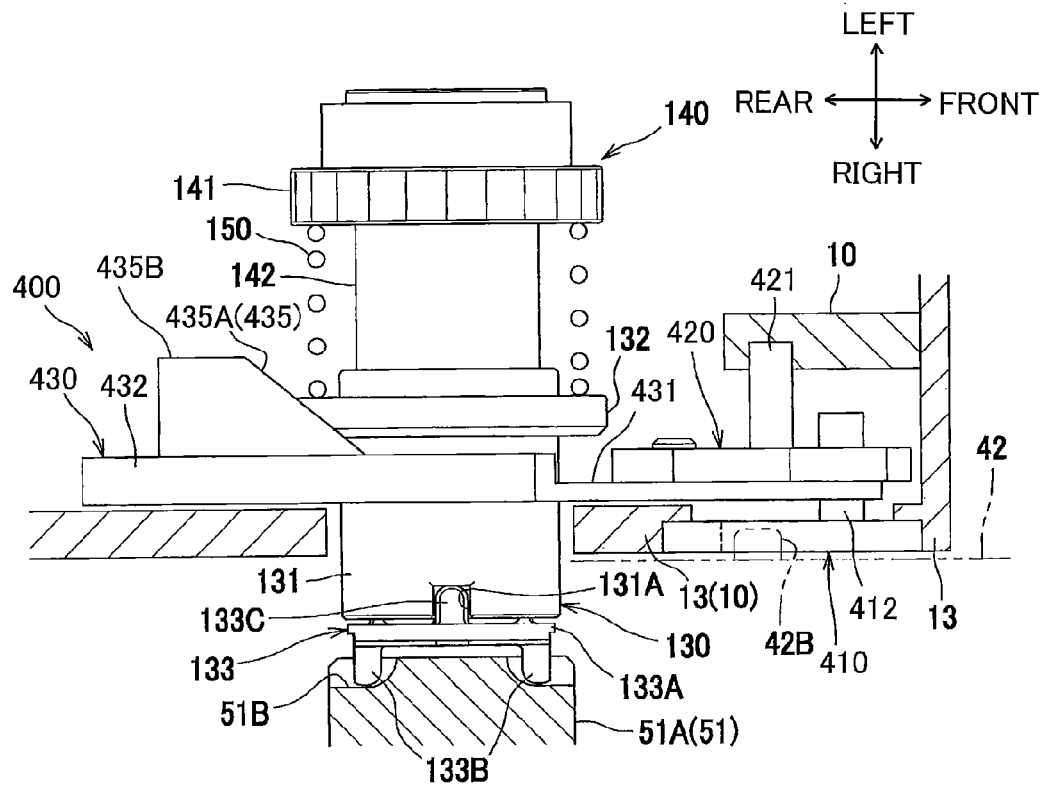
FIG. 14B is a bottom view illustrating the interlocking mechanism according to the second embodiment, wherein the holder is in the first position.

Next, the user lowers the holder 42 from the second position to the first position utilizing the weight of the holder 42 itself. At this time, the first link 410 moves downward together with the holder 42, causing the second link 420 to pivot clockwise and the third link 430 to move rearward, as illustrated in FIG. 14A. As a result of this operation, the retaining surface 435B of the cam 435 slides off the flange 132 of the body-side coupling 130, as shown in FIG. 14B. Consequently, the body-side coupling 130 moves from the interrupting position to the transmitting position by the biasing force of the coil spring 150 and couples with the belt-side coupling 51A.

To pull the holder 42 out of the main body 10, the user first lifts the holder 42 from its first position to its second position, as shown in FIG. 15A. At this time, the first link 410 moves upward, causing the second link 420 to pivot counterclockwise and the third link 430 to move forward. Consequently, the cam surface 435A of the cam 435 pushes the flange 132 of the body-side coupling 130 leftward to move the flange 132 onto the retaining surface 435B. The body-side coupling 130 thus moves from its transmitting position to its interrupting position against the biasing force of the coil spring 150 and is retracted from the belt-side coupling 51A. Next, the user pulls the holder 42 from its second position to its fifth position. Through this operation, the engaging protrusion 42B of the holder 42 is extracted from the slit 411 formed in the first link 410 while the guide parts 13 hold the first link 410 at the fourth position.

The depicted structure according to the second embodiment can obtain the following operational and technical advantages.

In a conventional structure that associates movement of a coupling with movement of a front cover, the connection formed by the coupling may become unstable when the front cover has not been completely closed. However, in the color printer 1A of the second embodiment, the interlocking mechanism 400 is provided for moving the body-side coupling 130 to the transmitting position, in which a drive force is transmitted to the belt-side coupling 51A, in association with movement of the holder 42 to the first position, at which the photosensitive drums 43 are in contact with the conveying belt 53. In this state, the conveying belt 53 of the belt unit 50 can operate properly during image formation.

Since the interlocking mechanism 400 is operated in conjunction with vertical movement of the holder 42, the weight of the holder 42 can be used to effectively operate the interlocking mechanism 400.

The engaging protrusion 42B can move the first link 410 while engaged therewith when the holder 42 moves both upward and downward. Therefore, the interlocking mechanism 400 can be configured without providing a spring or the like for returning a first link to the fourth position. That is, it is possible to configure an interlocking mechanism with a spring for urging the first link toward the fourth position, whereby the first link is moved to the third position using an engaging protrusion on the holder to press down on the top surface of the first link against the urging force of the spring, and the first link returns to the fourth position by the urging force of this spring when the holder is raised; but the interlocking mechanism 400 according to the second embodiment does not require such a spring. Further, since the spring in this type of structure applies a constant upward force to the holder, the state of contact between the photosensitive drums and the conveying belt may degrade over time. However, since the interlocking mechanism 400 of the second embodiment does not employ a spring, such degraded contact between the photosensitive drums 43 and the conveying belt 53 can be avoided.

Since the engaging protrusion 42B is provided on the side wall 42A constituting the holder 42, i.e., on the side of the body-side coupling 130, the structure of the interlocking mechanism 400 can be made simpler than a structure that provides an engaging protrusion on the side of the holder opposite the input-side coupling, for example.

By providing the engaging protrusion 42B above the contact surfaces 42G of the holder 42, the engaging protrusion 42B does not come into contact with the mounting surfaces or the like in the color printer 1A when the contact surfaces 42G of the holder 42 are placed on the corresponding mounting surfaces. This arrangement enables the holder 42 to be supported in a stable state on the mounting surfaces.

When the holder 42 is moved from the second position to the fifth position, the guide parts 13 maintain the first link 410 at its fourth position. Hence, the body-side coupling 130 can effectively be held at the interrupting position while the holder 42 is pulled to the fifth position. Further, since the first link 410 is maintained at the fourth position, the engaging protrusion 42B of the holder 42 can be reliably inserted into the slit 411 when the holder 42 is moved back from the fifth position to the second position.

By moving the holder 42 from the second position to the fifth position, the holder 42 can be exposed on the outside of the main body 10, facilitating operations for replacing the process units 41 and the like.

Other than above, similar technical advantages as the first embodiment can also be obtained in the structure of the second embodiment.

4. Variations to the Second Embodiment

Figure 16A:
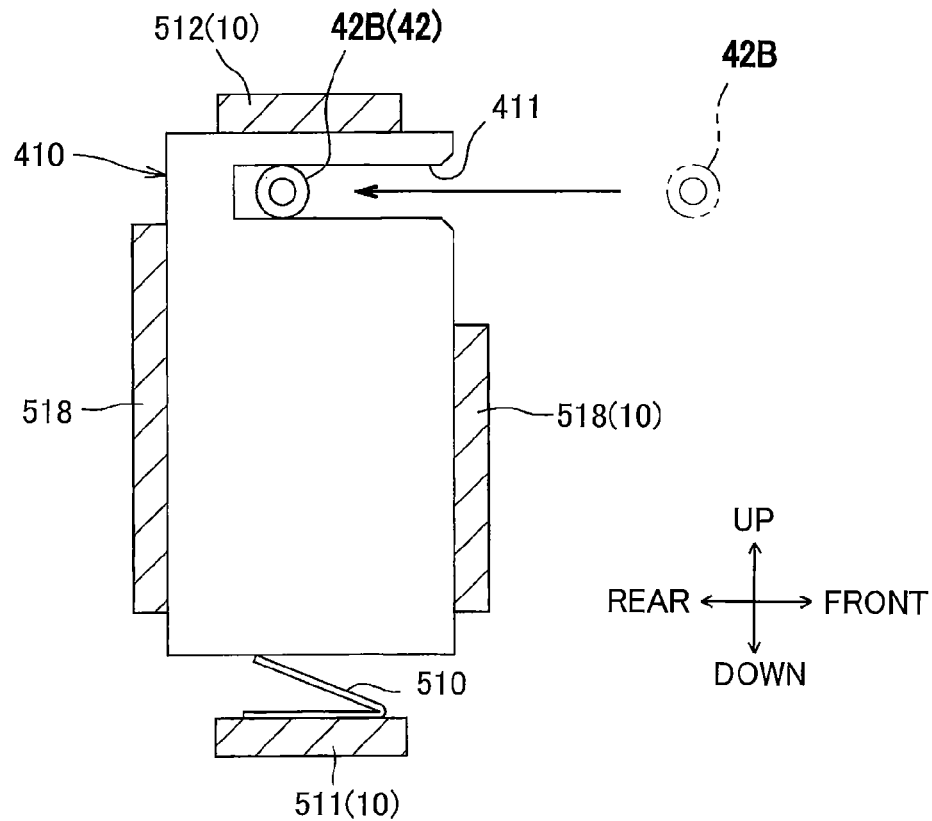
FIG. 16A is a schematic side view showing a structure of a holding part according to a variation of the second embodiment.

While the guide parts 13 are examples of the holding part in the second embodiment described above, the holding part may be configured as a spring. For example, FIG. 16A shows a spring 510 as another example of the holding part. The spring 510 is configured to retain the first link 410 at the fourth position. More specifically, a pair of guide parts 518 is provided in the main body 10 for supporting the first link 410 so that the first link 410 can move vertically. Here, the guide parts 518 define a gap therebetween that is slightly larger than the front-rear width of the first link 410. The main body 10 is also provided with a spring support part 511 that supports the spring 510, and a restricting wall 512 that restricts the first link 410 from moving further upward (i.e., in the direction away from the third position) from the fourth position shown in FIG. 16A.

In this variation, the spring 510 can suitably maintain the first link 410 in the fourth position. Note that the spring 110 may be configured to have a weak urging force that is merely sufficient to maintain the first link 410 in the fourth position and need not have a larger urging force for moving the first link 410 from the third position to the fourth position.

Figure 16B:
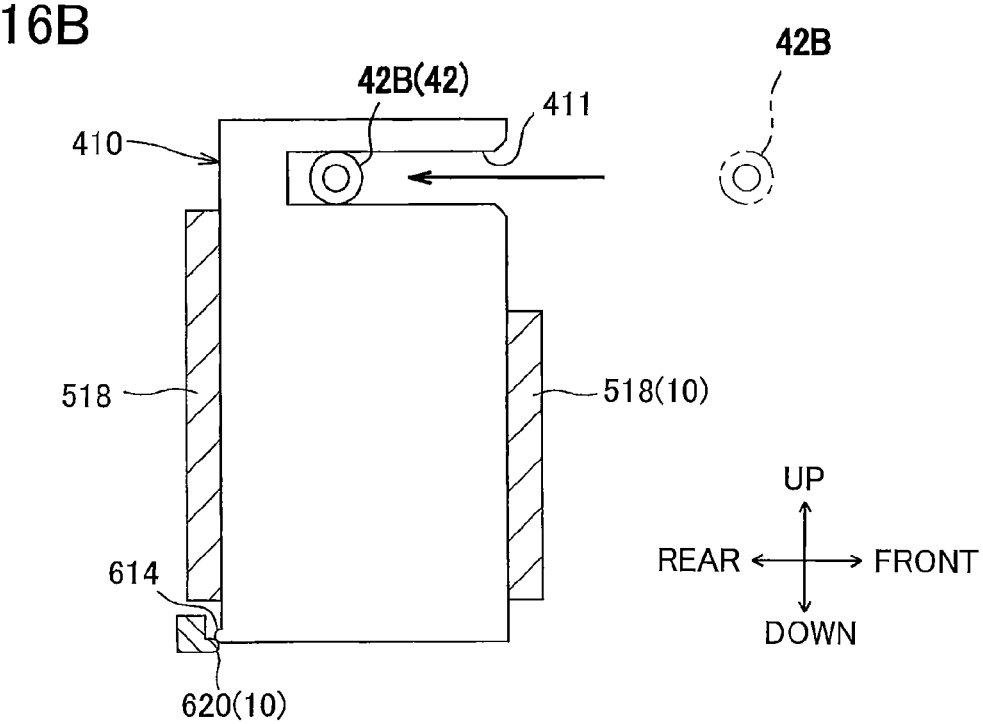
FIG. 16B is a schematic side view showing a structure of a holding part according to another variation of the second embodiment.

As another variation to the second embodiment, FIG. 16B shows an engaging protrusion 620 as another example of the holding part. The engaging protrusion 620 of this variation is provided in the main body 10 and is configured to engage with an engaged protrusion 614 formed on the first link 410 to hold the first link 410 in the fourth position. Both the engaged protrusion 614 and the engaging protrusion 620 are low-profile protrusions and are configured to disengage when the weight of the holder 42 is applied. With this configuration, the engagement between the engaged protrusion 614 and engaging protrusion 420 can properly maintain the first link 410 in the fourth position.

Further, the gap between the guide parts 13 of the second embodiment may be greater than the front-rear width of the first link 410, provided that sufficient frictional force is generated between the retaining surface 435B of the cam 435 and the flange 132 of the body-side coupling 130. This frictional force can also maintain the first link 410 in the fourth position through the third link 430 and second link 420 as frictional force generated by the flange 132 suppresses rearward movement of the third link 430. Here, the holding part of this case is the body-side coupling 130 that possesses the flange 132.

In the second embodiment, the engaging protrusion 42B is provided on the holder 42 and the slit 411 is formed in the first link 410. However, the opposite configuration is also possible; namely, the slit may be formed in the holder and the engaging protrusion that enters the slit may be provided on the first link. In this case, the top surface formed in the slit serves as the first engaging part, while the bottom surface formed in the slit serves as the second engaging part.

5. Other Variations and Modifications

The cam 235 of the first embodiment and the cam 435 of the second embodiment are both configured to move in a direction orthogonal to the axial direction of the drive roller 51. However, alternative configurations are conceivable. For example, the cam may have a plurality of cam surfaces arranged concentrically with the axis of the movable part. This cam may be configured to pivot about this axis such that its cam surfaces move in a circumferential direction and press against the movable part.

The conveying belt 53 as an example of the belt in the first and second embodiments described above is stretched over two rollers (drive roller 51 and follow roller 52). Alternatively, the belt may be looped around a drive roller and two or more follow rollers, for example. In this case, the first direction is the direction in which the belt is stretched between the drive roller and the follow roller disposed upstream of the drive roller in the circulating direction of the belt.

In the first and second embodiments described above, the conveying belt 53 for conveying the sheets P of paper serves as an example of the belt. However, the belt may be a transfer belt or the like for carrying toner images and transferring the images onto paper. Further, the photosensitive member may be a member other than the photosensitive drum 43, such as a belt-like photosensitive member.

In the first and second embodiments described above, the body-side coupling 130 is provided in the main body 10 as the movable part, and the belt-side coupling 51A is provided on the belt unit 50. However, the movable part may be provided on the belt unit while the member that the movable part couples with and uncouples from may be provided in the main body.

While both of the interlocking mechanism 200 of the first embodiment and the interlocking mechanism 400 of the second embodiment described above have three links (210-230 and 410-430) respectively, the number of links may be modified as desired. Further, the interlocking mechanism may be configured of members other than links, such as a pinion gear and a rack gear.

While the tension coil spring 120 serves as an example of the urging member, the urging member may be a compression coil spring, a leaf spring, or a torsion spring, for example. Similarly, the biasing member is not limited to the compression coil spring 150 but may be a tension coil spring, a leaf spring, or a torsion spring, for example.

While the disclosure is applied to a color printer in the depicted embodiments, the disclosure may also be applied to another image-forming apparatus, such as a copy machine or a multifunction device.

While the description has been made in detail with reference to specific embodiments thereof, it would be apparent to those skilled in the art that various changes and modifications may be made therein without departing from the scope of the above described embodiments.

What is claimed is:

1. An image-forming apparatus comprising:
    a main body;
    a drive source provided in the main body and configured to generate a drive force;
    an image forming section configured to form an image and including a trigger part and a belt unit, the belt unit comprising:
        a belt;
        a drive roller defining an axis extending in an axial direction and configured to rotate about the axis; and
        a follow roller opposing the drive roller in a first direction perpendicular to the axial direction, the belt being stretched over the drive roller and the follow roller and extending in the first direction;
    a coupling comprising a movable part configured to move between a transmitting position transmitting the drive force from the drive source to the drive roller and an interrupting position interrupting transmission of the drive force from the drive source to the drive roller; and
    an interlocking mechanism provided in the main body and configured to interlock movement of the movable part between the transmitting position and the interrupting position with movement of the trigger part of the image forming section.

2. The image-forming apparatus as claimed in claim 1, wherein the belt unit is attachable to and detachable from the main body, the trigger part being provided on the belt unit,
    wherein the interlocking mechanism is configured to move the movable part from the interrupting position to the transmitting position upon attachment of the belt unit to the main body, and
    wherein the interlocking mechanism is configured to move the movable part from the transmitting position to the interrupting position upon detachment of the belt unit from the main body.

3. The image-forming apparatus as claimed in claim 2, wherein the main body further comprises:
    a moving member configured to move between a first position and a second position in accordance with attachment and detachment of the belt unit relative to the main body, the moving member being at the first position when the belt unit is detached from the main body, the moving member being at the second position when the belt unit is attached to the main body; and
    an urging member configured to urge the moving member toward the first position from the second position.

4. The image-forming apparatus as claimed in claim 3, wherein the main body further comprises a positioning part configured to perform positioning of the belt unit in the first direction, and
    wherein the urging member is configured to urge the belt unit against the positioning part via the moving member.

5. The image-forming apparatus as claimed in claim 4, wherein the moving member comprises a first moving part and a second moving part positioned to interpose the belt unit therebetween in the axial direction,
    wherein the positioning part comprises a first positioning part and a second positioning part positioned to interpose the belt unit there between in the axial direction, and
    wherein the urging member comprises a first urging part and a second urging part positioned to interpose the belt unit therebetween in the axial direction, the interlocking mechanism being interlocked with one of the first moving part and the second moving part.

6. The image-forming apparatus as claimed in claim 3, wherein the belt unit comprises a side surface facing outward in the axial direction and an engaging part protruding outward from the side surface in the axial direction, the engaging part serving as the trigger part and being configured to engage the moving member upon attachment of the belt unit to the main body.

7. The image-forming apparatus as claimed in claim 6, wherein the belt unit further comprises a grip part configured to be gripped by a user, the axis of the drive roller and the engaging part defining a first distance there between in the first direction, the engaging part and the grip part defining a second distance therebetween in the first direction, the second distance being larger than the first distance.

8. The image-forming apparatus as claimed in claim 2, wherein the main body further comprises a restricting part configured to restrict the drive roller from moving in a second direction perpendicular to the axial direction and the first direction.

9. The image-forming apparatus as claimed in claim 8, wherein the restricting part is further configured to restrict the drive roller from moving in the first direction, and
    wherein the movable part is arranged along the axis of the drive roller to move between the transmitting position and the interrupting position in the first direction.

10. The image-forming apparatus as claimed in claim 1, wherein the image forming section further comprises:
    a plurality of photosensitive drums juxtaposed in the first direction; and
    a moving member configured to support the plurality of photosensitive drums and including the trigger part, the moving member being movable between a first position and a second position relative to the main body in a second direction crossing the first direction but different from the axial direction, the moving member at the first position allowing the plurality of photosensitive drums supported by the moving member to be in contact with the belt of the belt unit, the moving member at the second position allowing the plurality of photosensitive drums supported by the moving member to be separated from the belt of the belt unit, and
    wherein the interlocking mechanism is configured to interlock movement of the movable part between the transmitting position and the interrupting position with movement of the moving member between the first position and the second position.

11. The image-forming apparatus as claimed in claim 10, wherein the second direction includes a vertical component.

12. The image-forming apparatus as claimed in claim 10, wherein the moving member comprises a first engaging part and a second engaging part engageable with the interlocking mechanism and serving as the trigger part, the first engaging part engaging the interlocking mechanism during movement of the moving member from the second position to the first position, the second engaging part engaging the interlocking mechanism during movement of the moving member from the first position to the second position.

13. The image-forming apparatus as claimed in claim 12, wherein the moving member comprises a side wall facing the coupling in the axial direction, the first engaging part and the second engaging part being provided on the side wall.

14. The image-forming apparatus as claimed in claim 12, wherein the moving member is attachable to and detachable from the main body, the moving member comprising a contact surface, the contact surface of the moving member attached to the main body being positioned closer to the belt unit than the photosensitive drums to the belt unit, the first engaging part and the second engaging part being positioned closer to the photosensitive drums than the contact surface is to the photosensitive drums.

15. The image-forming apparatus as claimed in claim 10, wherein the interlocking mechanism comprises an interlocking member engageable with the moving member and configured to move between a third position and a fourth position in conjunction with movement of the moving member between the first position and the second position, the interlocking member being at the fourth position when the moving member is at the second position, and
wherein the main body comprises a holding part configured to hold the interlocking member at the fourth position.

16. The image-forming apparatus as claimed in claim 10, wherein the second direction is perpendicular to the axial direction and the first direction, and
wherein the main body further comprises a restricting part configured to restrict the drive roller from moving in the second direction.

17. The image-forming apparatus as claimed in claim 10, wherein the moving member is further movable relative to the main body between the second position and a fifth position in the first direction, at least part of the moving member at the fifth position being withdrawn from the main body to be exposed outside therefrom.

18. The image-forming apparatus as claimed in claim 1, wherein the coupling comprises a biasing member configured to apply a biasing force to the movable part toward the transmitting position,
wherein the interlocking mechanism comprises a cam configured to press the movable part toward the interrupting position.

19. The image-forming apparatus as claimed in claim 18, wherein the cam is configured to move in the first direction.

20. The image-forming apparatus as claimed in claim 1, wherein the movable part is provided on the main body.

21. The image-forming apparatus as claimed in claim 1, wherein the belt unit is attachable to and detachable from the main body and is provided with an engaged part,
wherein the image forming section further comprises a moving member engageable with the engaged part of the belt unit attached to the main body, the moving member serving as the trigger part, the moving member being configured to move between a release position and a restricting position in accordance with engagement and disengagement of the moving member relative to the engaged part, the moving member being at the release position when disengaged from the engaged part and being configured to allow detachment of the belt unit from the main body, the moving member being at the restricting position when engaged with the engaged part and being configured to restrict displacement of the belt unit attached to the main body, and
wherein the interlocking mechanism is configured to move the movable part between the transmitting position and the interrupting position in conjunction with movement of the moving member between the restricting position and the release position.

22. An image-forming apparatus comprising:
a main body;
a drive source configured to generate a drive force;
a belt unit attachable to and detachable from the main body, the belt unit comprising:
  a belt;
  a drive roller defining an axis extending in an axial direction and configured to rotate about the axis; and
  a follow roller opposing the drive roller in a first direction perpendicular to the axial direction, the belt being stretched over the drive roller and the follow roller and extending in the first direction;
a coupling comprising a movable part configured to move between a transmitting position transmitting the drive force from the drive source to the drive roller and an interrupting position interrupting transmission of the drive force from the drive source to the drive roller;
a moving member configured to move between a first position and a second position in accordance with attachment and detachment of the belt unit relative to the main body, the moving member moving from the first position to the second position upon attachment of the belt unit to the main body, the moving member moving from the second position to the first position upon detachment of the belt unit from the main body; and
an interlocking mechanism configured to interlock movement of the movable part with movement of the moving member, the interlocking mechanism being configured to move the movable part to the transmitting position in conjunction with movement of the moving member from the first position to the second position, the interlocking mechanism being configured to move the movable part to the interrupting position in conjunction with movement of the moving member from the second position to the first position.

23. An image-forming apparatus comprising:
a main body;
a drive source configured to generate a drive force;
a belt unit comprising:
  a belt;
  a drive roller defining an axis extending in an axial direction and configured to rotate about the axis; and
  a follow roller opposing the drive roller in a first direction perpendicular to the axial direction, the belt being stretched over the drive roller and the follow roller and extending in the first direction;
a coupling comprising a movable part configured to move between a transmitting position transmitting the drive force from the drive source to the drive roller and an interrupting position interrupting transmission of the drive force from the drive source to the drive roller;
a plurality of photosensitive drums juxtaposed in the first direction;

a moving member configured to support the plurality of photosensitive drums and configured to move between a first position and a second position relative to the main body in a second direction crossing the first direction but different from the axial direction, the moving member at the first position allowing the photosensitive drums supported by the moving member to be in contact with the belt of the belt unit, the moving member at the second position allowing the photosensitive drums supported by the moving member to be separated from the belt of the belt unit; and an interlocking mechanism configured to interlock movement of the movable part with movement of the moving member, the interlocking mechanism being configured to move the movable part to the transmitting position in conjunction with movement of the moving member from the second position to the first position, the interlocking mechanism being configured to move the movable part to the interrupting position in conjunction with movement of the moving member from the first position to the second position.

* * * * *